(12) United States Patent
Bronstein et al.

(10) Patent No.: US 8,417,037 B2
(45) Date of Patent: **\*Apr. 9, 2013**

(54) METHODS AND SYSTEMS FOR REPRESENTATION AND MATCHING OF VIDEO CONTENT

(76) Inventors: Alexander Bronstein, San Jose, CA (US); Michael Bronstein, Santa Clara, CA (US); Shlomo Selim Rakib, Cupertino, CA (US)

( \* ) Notice: Subject to any disclaimer, the term of this patent is extended or adjusted under 35 U.S.C. 154(b) by 1038 days.

This patent is subject to a terminal disclaimer.

(21) Appl. No.: 12/349,478

(22) Filed: Jan. 6, 2009

(65) Prior Publication Data

US 2009/0175538 A1 Jul. 9, 2009

Related U.S. Application Data

(63) Continuation-in-part of application No. 11/778,633, filed on Jul. 16, 2007, now Pat. No. 8,224,087, and a continuation-in-part of application No. 11/944,290, filed on Nov. 21, 2007, now Pat. No. 8,170, 392.

(60) Provisional application No. 61/045,278, filed on Apr. 15, 2008.

(51) Int. Cl.
*G06K 9/46* (2006.01)

(52) U.S. Cl. .......................... 382/190; 382/192; 382/195

(58) Field of Classification Search .................. 382/190, 382/192, 195, 201
See application file for complete search history.

(56) References Cited

U.S. PATENT DOCUMENTS

| | | | | |
|---|---|---|---|---|
| 5,884,320 | A | * | 3/1999 | Agrawal et al. ........................ 1/1 |
| 6,173,275 | B1 | * | 1/2001 | Caid et al. ......................... 706/14 |
| 6,675,174 | B1 | * | 1/2004 | Bolle et al. ............................ 1/1 |
| 7,007,019 | B2 | * | 2/2006 | Kanno ................... 1/1 |
| 7,966,327 | B2 | * | 6/2011 | Li et al. .......................... 707/737 |
| 8,009,861 | B2 | * | 8/2011 | Lu et al. ......................... 382/100 |
| 2002/0013948 | A1 | * | 1/2002 | Aguayo et al. .................. 725/91 |
| 2005/0169529 | A1 | * | 8/2005 | Owechko et al. ............. 382/190 |
| 2005/0238238 | A1 | * | 10/2005 | Xu et al. ........................ 382/224 |
| 2007/0217676 | A1 | * | 9/2007 | Grauman et al. ............. 382/170 |

\* cited by examiner

*Primary Examiner* — Pankaj Kumar
*Assistant Examiner* — Timothy Newlin
(74) *Attorney, Agent, or Firm* — Stephen E. Zweig

(57) ABSTRACT

The described methods and systems provide for the representation and matching of video content, including spatio-temporal matching of different video sequences. A particular method of determining temporal correspondence between different sets of video data inputs the sets of video data and represents the video data as ordered sequences of visual nucleotides. Temporally corresponding subsets of video data are determined by aligning the sequences of visual nucleotides.

20 Claims, 26 Drawing Sheets

FIG. 6
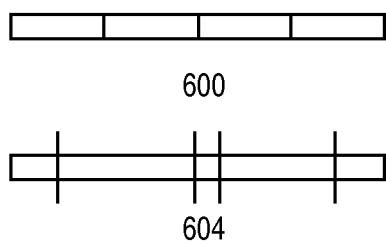
600
604
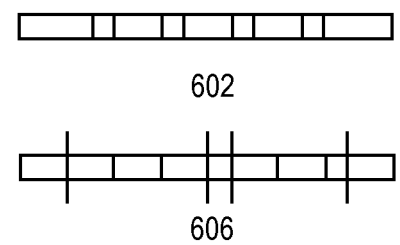
602
606

US 8,417,037 B2

METHODS AND SYSTEMS FOR REPRESENTATION AND MATCHING OF VIDEO CONTENT

RELATED APPLICATIONS

This application claims the priority benefit of US Provisional Patent Application No. 61/045,278, "Video Genomics: a framework for representation and matching of video content", filed Apr. 15, 2008, the disclosure of which is incorporated by reference herein. This application is also a Continuation In Part of, and claims the priority benefit of, U.S. patent application Ser. No. 11/778,633 "Method and Apparatus for Video Digest generation", filed Jul. 16, 2007 now U.S. Pat. No 8,224,087, the disclosure of which is incorporated by reference herein. This application is also a Continuation In Part of, and claims the priority benefit of, U.S. patent application Ser. No. 11/944,290 "Method and apparatus for generation, distribution, and display of interactive video control", filed Nov. 21, 2007 now U.S. Pat. No. 8,170,392, the disclosure of which is incorporated by reference herein. This application is also related to U.S. patent application Ser. No. 12/349,473, "Universal lookup of video-related data", filed Jan. 6, 2009, and related to U.S. patent application Ser. No. 12/349,469, "Methods and systems for representation and matching of video content", filed Jan. 6, 2009.

BACKGROUND

The invention relates to the field of video analysis, such as the comparison and finding of correspondence and similarity between video sequences.

Matching of video sequences is an important problem in video analysis and computer vision. It is a cornerstone component in many commercial applications, including video search, content based retrieval, video authentication and copyright detection, to mention a few.

One good example of prior art work in video sequence matching is J. Sivic and A. Zisserman, "Video Google: a text retrieval approach to object matching in video", Ninth IEEE International Conference on Computer Vision (ICCV'03)-Volume 2, 2003, iccv, p. 1470. These authors describe an approach to object and scene retrieval which searches and localizes all the occurrences of a user outlined object in a video.

One problem with such prior art methods, however, is that because such prior art video analysis methods tended to approach video as a collection of images, these approaches were both computationally intensive and prone to high error rates. In particular, such earlier "single-frame" image analysis methods had little ability to distinguish between, for example, an image of an apple (fruit) in the context of images of fruits, and the image of an the same apple (same image, now used as a logo) in the context of a series of images of computers.

Thus, there is a need for less computationally intensive, higher reliability video analysis methods that do a better job of interpreting individual video images within their overall video context.

SUMMARY

One of the key insights behind the invention is the realization that it is useful to think about video analysis problems in biological terms, and draw insight and inspiration from bioinformatics. In particular, it is useful to think of the individual features in the video frame as being a generalized type of "atom", the feature abstraction of the various video frames in a video as a generalized "nucleotide" built up from these "atoms", the video itself as being similar to an ordered sequence of nucleotides, such as a DNA or RNA molecule (i.e., video DNA), and the problem of video analysis as a generalized type of bioinformatics sequence matching problem.

The invention provides an improved way to identify video sequences at different levels of time and space granularity: ranging from identifying entire video sequences (e.g., determining that two given video sequences have an underlying similarity, despite various distortions or edits), to identifying temporal (time) correspondences between different video portions (e.g., determining what portion of a video library best fits a portion of a video of interest), to identifying what "thing" in a database best corresponds to a "thing" of interest that is being shown on a particular video portion.

According to the invention, the video sequences are represented by a hierarchy of feature descriptors. These feature descriptors are selected to be robust (relatively invariant to image distortions such as rotation, different lighting conditions, different resolution, and the like), and the descriptors carry the visual information in data units of different granularity. In recognition of the similarity between this approach and techniques from bioinformatics, this approach is referred to as "video genomics".

We have found that it is useful to split the larger problem of video spatio-temporal matching into two stages: in the first stage, the video media of interest are matched at the time (temporal) level. In the second stage, "things" of interest between time-matched video frames are analyzed at the spatial level, and corresponding "things" between different time-matched video frames are determined.

Spatial and temporal distortions or spatial edits of video content (such as changing the resolution, frame rate, overlaying subtitles, etc.) may result in changes of the representations. Temporal edits (such as inserting advertisements) may result in insertions or deletions of the representations. Again making use of the biological and bioinformatics analogy, it is useful to consider such video alterations as being a generalization of the biological concept of the concept of genetic "mutations". Just as bioinformatics methods have been developed that can show similarities between DNA sequences, despite the presence of various types of mutations, generalized versions of these bioinformatics techniques can also be helpful in analyzing different video sequences. Using this approach, different video media can be precisely analyzed, in spite of alterations (mutations) such as different resolutions, frame rates, subtitles, insertions, and deletions.

BRIEF DESCRIPTION OF THE DRAWINGS

FIG. 6 shows an example of dividing a video sequence into temporal intervals.

Throughout the description, similar reference numbers may be used to identify similar elements.

DETAILED DESCRIPTION

Figure 1:
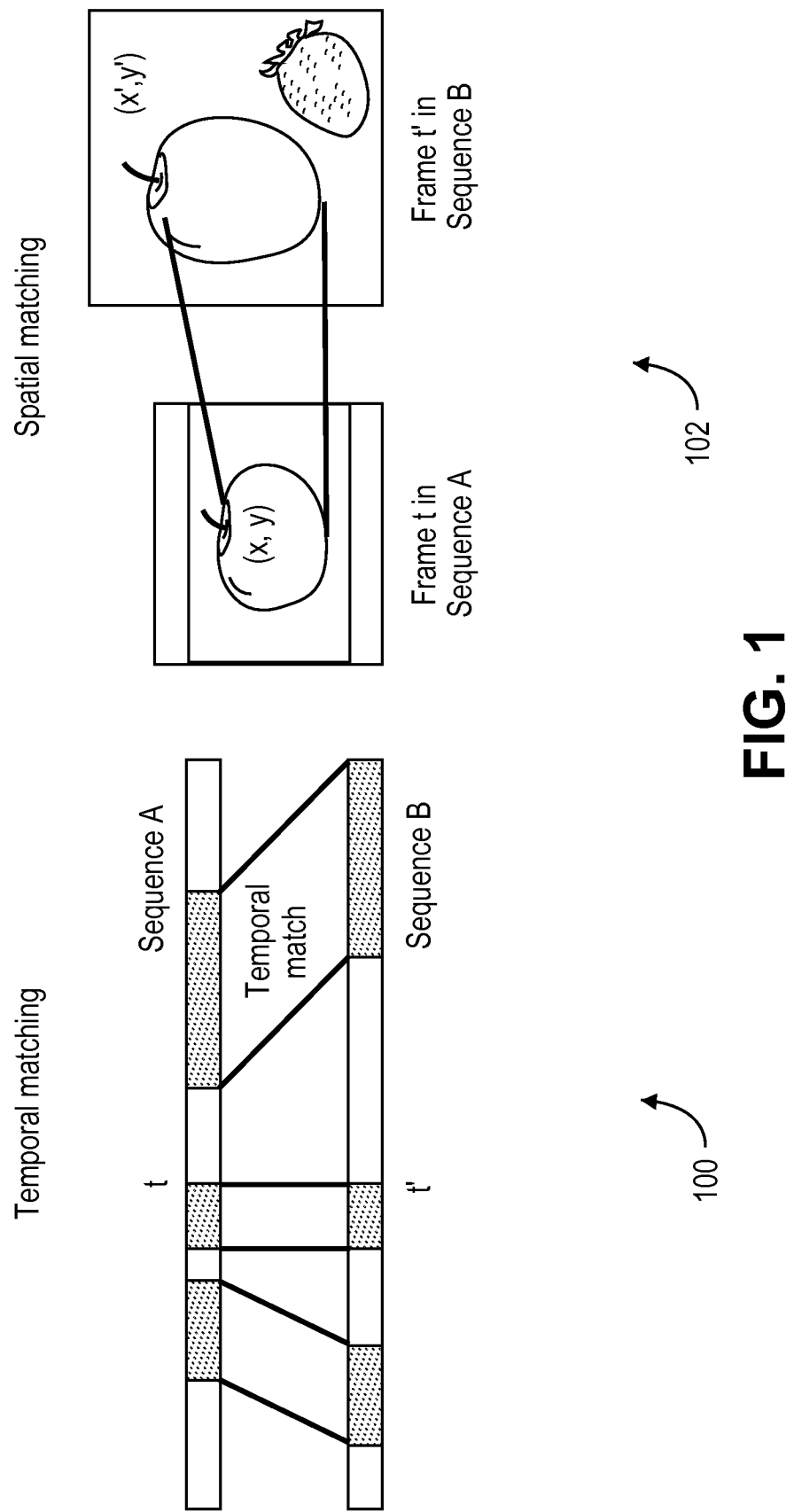
FIG. 1 shows examples of the spatial and temporal alignment of video.

Before proceeding with a detailed discussion of the invention's video DNA or video genomics approach, the general problem of video analysis will first be discussed at the more abstract mathematical level.

At a mathematical level, the general problem of matching actually refers to two inter-related problems: what is the degree of similarity (similarity), and what parts match? (correspondence). The goal of a similarity problem is, given two video sequences, compute a number that represents the degree to which the two sequences resemble each other. The goal of a correspondence problem is, given two video sequences, find the matching parts in them.

Since video represents spatio-temporal data, containing two spatial and one temporal dimensions (i.e., the 2D video images, and the time sequence of the different video frames), we distinguish between temporal and spatial correspondence. Temporal correspondence is performed at the time granularity of the time between different video frames: the video sequences are regarded as one-dimensional ordered sequences of frames, and the matching produces a correspondence between the frames in the two sequences. Spatial correspondence is performed at a sub-frame granularity, finding matching between corresponding pixels or regions of pixels "things" within two frames in the sequences.

The correspondence and similarity problems are intimately related, and usually computing one problem allows one to infer that the other problem is also being computed. For example, we can define the similarity as the amount of corresponding parts of the video. Conversely, if we have a criterion of similarity between the different parts of the video sequences, we can define a correspondence that maximizes this part-wise similarity.

Here we want to distinguish between two types of similarity: semantic and visual. "Visual" similarity of two objects implies that they "look similarly", i.e., their pixel representation is similar. "Semantic" similarity implies that the concepts represented by the two objects are similar. Semantic similarity defines much wider equivalence classes than visual similarity. For example, a truck and a Ferrari are visually dissimilar, but semantically similar (both represent the concept of a vehicle). As a rule, visual similarity is easier to quantify and evaluate, while semantic similarity is more subjective and problem-dependent.

There is almost always noise and distortion in video signals, caused by differing angles, lighting conditions, editing, resolution, and the like. Here an ideal similarity criterion should be invariant to these and other variations. In terms of nomenclature, if the similarity criterion deems the depictions of two objects similar no matter how they are illuminated, we say that the similarity is invariant to lighting conditions.

The described systems and methods allow for edit- and distortion-invariant matching of video sequences. More specifically, the systems and methods provide a framework for spatio-temporal matching based on visual similarity, which is invariant to temporal distortions (transformations like frame rate change), temporal edits (removal and insertion of frames), spatial distortions (pixel-wise operations) and spatial edits (removal or insertion of content into frames).

On a mathematical level, the problem of spatio-temporal matching can be formulated as: given two video sequences, find a correspondence between the spatio-temporal system of coordinates (x, y, t) in the first sequence and the spatio-temporal system of coordinates (x', y', t') in the second system.

Thinking of video data as a three-dimensional array of pixels, the spatio-temporal matching problem can be considered as finding the correspondence between three-dimensional arrays. In general, this problem is so computationally complex (complexity level NP-complete), as to be impractical to compute. This is because without further simplification, the computing system will try to find matching between all the possible subsets of pixels between the first and the second sequences, and this is a huge number of operations.

However as previously discussed, the matching problem can be greatly simplified if the problem is split into two separate processes: temporal matching and spatial matching. Here the problem of spatial matching is more complex because the video frames are two dimensional, and thus a huge number of two dimensional comparisons must be made. By contrast, the one-dimensional temporal matching problem, although still complex, is enough simpler that one-dimensional (temporal) signals can be matched very efficiently using the invention's video DNA or video genomics dynamic programming methods.

To review, according to the present invention, the process of spatio-temporal matching between video sequences is treated by dividing the problem into two main stages, such as shown in FIG. 1.

At the first stage 100 of FIG. 1, temporal matching is performed (this step is discussed in more detail below). Temporal matching produces the correspondence between the temporal coordinate "t" in a subset of the first video sequence and the temporal coordinate "t'" in a subset of the second video sequence. By performing temporal matching, we avoid the need to try to perform two dimensional spatial matching between all the possible subsets of pixels in the video sequences (essentially a three dimensional matching problem). Rather, the problem is reduced in size so that the spatial matching must now only be performed between the small subsets of temporally corresponding portions of the video sequences. In other words, for the spatial matching, a large 3D matching problem is turned into a much smaller 2D matching problem between relatively small sets of 2D video frames. For example, instead of trying to match the "apple" series of pixels "thing" from the entire upper video sequence into a corresponding "apple" thing in the entire lower video sequence, now just the small number of frames in "sequence A" and "sequence B" which are most relevant are examined.

Typically, one of the video sequences is a short query, and thus the size of the temporally corresponding portions of the video sequences is small, which greatly reduces the problem of spatial matching, discussed below.

At the second stage 102 of FIG. 1, spatial matching between the temporally corresponding video data is performed. Spatial matching produces the correspondence between the spatial coordinates (x, y) and (x', y') in the temporally matching portions (e.g., frames) of the first and second sequences.

Although there are prior art generic algorithms in literature that perform matching of one dimensional signals and two-dimensional signals, which are constituents of stages one and two in the above scheme, most are not robust enough to work effectively when the video content is edited or distorted.

Here, the invention shows its superiority to prior art because the matching can be made more robust and invariant to distortions and edits of the video content. In particular, the temporal matching can be made to be invariant to temporal edits of the video sequences (for example, insertions of content visualized as white areas in FIG. 1). Spatial matching can be made to be invariant to spatial distortions and edits of the video sequences (for example, the different aspect ratio of the apple, different lighting, and the background of different fruits shown in FIG. 1).

Thus, prior art methods had difficulty performing invariant spatio-temporal matching between video sequences. By contrast, the invention shows how to address this type of problem in an efficient manner.

It should be understood that the methods of the invention are normally carried out in a computer system containing at least one processor (often a plurality of processors will be used), and memory (often megabytes or gigabytes of memory will be used). Processors suitable for implementing the methods of the present invention will often be either general purpose processors, such as x86, MIPS, Power, ARM, or the like, or they may be dedicated image interpretation processors, such as video processors, digital signal processors, field programmable gate arrays, and the like. The methods described herein may be programmed in a high level language, such as "C", C+", java, Perl, Python, and the like, programmed in a lower level assembly language, or even embedded directly into dedicated hardware. The results of this analysis may be stored in either volatile memory, such as RAM, or in non-volatile memory such as flash memory, hard drives, CD, DVD, Blue-ray disks, and the like.

Prior computer vision art has shown that visual information (image) can be represented by means of a small number of "points of interest", also called "features". Typically, features are points that are easily detectable in the image in a way that is invariant to various image modifications. A "feature" in an image includes both the coordinates of the "point of interest" as well as a "descriptor" which typically describes the local image content or environment around the "point of interest". Features are often chosen for their ability to persist even if an image is rotated, presented with altered resolution, presented with different lighting, etc.

A feature is usually described as a vector of information associated with a spatio-temporal subset of the video. For example, a feature can be the 3D direction of a spatio-temporal edge, local direction of the motion field, color distribution, etc. Typically, local features provide a description of the object, and global features provide the context. For example, an "apple" object in a computer advertisement and an "apple" object in an image of various fruits may have the same local features describing the object, but the global context will be different.

For example, local features may include:
Harris corner detector and its variants, as described in C. Harris and M. Stephens, "A combined corner and edge detector", Proceedings of the 4th Alvey Vision Conference, 1988;
Scale invariant feature transform (SIFT), described in D. G. Lowe, "Distinctive image features from scale-invariant keypoints," International Journal of Computer Vision, 2004;
Motion vectors obtained by decoding the video stream;
Direction of spatio-temporal edges;
Distribution of color;
Description of texture;
Coefficients of decomposition of the pixels in some known dictionary, e.g., of wavelets, curvelets, etc.
Specific objects known a priori.

Extending this idea to video data, we can abstract a video sequence into a three-dimensional structure of features (two spatial dimensions formed by the various 2D images, and one time dimension formed by the various video frames). This 3D structure can be used as the basic building blocks of a representation of the video sequence.

As previously discussed, one of the key insights behind the invention is the realization that it can be extremely useful to think about video analysis problems in biological terms, and draw insight and inspiration from bioinformatics. Here, for example, it is useful to think of the features as "atoms", the feature abstraction of the various video frames in a video as a "nucleotide", and the video itself as being like an ordered sequence of nucleotides, such as a large DNA or RNA molecule.

The spatial and the temporal dimensions in the video sequence have different interpretations. Temporal dimension can be though of as ordering of the video data—we can say that one feature comes before another. If we divide the video sequence into temporal intervals, we can consider it as an ordered sequence of "video elements", each of which contains a collection of features.

As previously discussed, here we consider the video data to be an ordered sequence of smaller nucleotides, and we consider a video signal to be also composed of a string of "nucleotide-like" video subunits, called video DNA.

Drawing upon inspiration from DNA sequence analysis, the invention represents a video both as three-, two- and one-dimensional signals. Considering the entire set of feature points, we have a three-dimensional (spatio-temporal) structure. Considering the sequence of temporal intervals, we obtain a one-dimensional representation. Considering one frame in the sequence, we obtain a two-dimensional representation. The invention uses the same representation to carry out the temporal and spatial matching stages. An example two-stage matching approach follows.

At the first stage, a temporal representation of the video sequences is created. Each video sequence is divided into temporal intervals. Here a temporal interval is usually not just a single video frame, but rather is a series of at least several video frames (e.g., 3 to 30 frames) spanning a fraction of a second. Temporal intervals are discussed in greater detail herein.

For each time interval, the actual video image is abstracted into a representation (also referred to herein as a visual nucleotide) containing just the key features in this interval. This series of features is then further abstracted and compressed by discarding the spatio-temporal coordinates of the various features. For example, we just start counting different types of features. In other words, we only keep track of the feature descriptors, and how many different types of feature descriptors there are.

Each time division of the video signal (which we will call a "nucleotide" in analogy to a biological nucleotide) is represented as an unordered collection or "bag" of features (or a bag of feature descriptors). Thus, if each feature is considered to be a "visual atom", the "bag of features" that represents a particular video time interval can be called a "nucleotide". The representations of the various video time intervals (visual nucleotides) are then arranged into an ordered "sequence" or map (video DNA). In this discussion, we will generally use the term "nucleotide" rather than "bag of features" because it helps guide thinking towards a useful bioinformatic approach to video analysis procedures.

The video map/video DNAs corresponding to two video sequences can be aligned in much the same way that DNA sequences can be compared and aligned. In DNA sequence analysis, one of the central problems is trying to find alignment which gives the best correspondence between subsets of the two DNA sequences by maximizing the similarity between the corresponding nucleotides and minimizing the gaps. In the systems and methods described herein, algorithms similar to those used in bioinformatics for DNA sequence alignment can be used for aligning two different video signals.

After two portions of video media are matched by the first stage, additional image analysis can be done. For example, at the second stage, the spatial correspondence between temporally corresponding subsets of the video sequences can be found. That is, "things" (pixel groups) shown in a first video can be matched with "things" shown in a second video. More specifically, we can now look for spatial correspondence between the contents of two temporally-corresponding video image frames.

In this later second stage, we do not discard the spatio-temporal coordinates of the features. Rather, in this second stage each frame is represented as a two-dimensional structure of features, and we retain the feature coordinates. For this second stage purpose of spatial matching of frames and comparing the contents of the video frames, more standard feature-based algorithms, previously used in computer vision literature can now be used.

For object recognition, and other applications where object-based analysis is required, the "Video genomics" approach offers significant advantages over prior art methods, including the following.

First, the systems and methods described herein offer a higher discriminative power than standalone object descriptors. This discriminative power is due to the discriminative power of the object descriptors themselves as well as the temporal support, i.e., the time sequence of these descriptors. Although prior art methods teach that the best discrimination is obtained when a large number of precisely optimized features are used, we have found that this is not the case. Surprisingly, we have found that when the systems and methods described herein are compared on a head-to head basis with prior art techniques, it turns out that the temporal support (i.e., the time order in which various feature groups appear) is more important for discriminative power than is a very large number of different descriptors.

For example, increases in accuracy in object description are usually desirable. The prior art "brute force" way to increase accuracy would be to simply use more and more features and feature descriptors, but since each feature and feature descriptor is computationally intensive to produce, this prior art "brute force" approach rapidly reaches a point of diminishing returns due to high computational overhead.

However, we have found that an increase of accuracy of object description that would otherwise require a prior art increase of the visual vocabulary size by two orders of magnitude (increasing computational overhead by nearly two orders of magnitude as well) can be easily matched by the described systems and methods using a computationally less intense process. Using the systems and methods described herein, to improve accuracy, we avoid increasing the number of feature descriptors, and instead improve accuracy by an increase in the time resolution of the analysis. This is done by simply adding two more "nucleotides" (i.e., using slightly smaller time divisions in the video analysis) to the "video DNA" sequences being compared. By avoiding a drastic increase in the number of features, the systems and methods can achieve high accuracy, yet can be much more efficient from a computational overhead standpoint.

Prior art approaches, such as J. Sivic and A. Zisserman, "Video Google: a text retrieval approach to object matching in video" approached video as a collection of images and thus had to use feature "vocabularies" of very large size (up to millions of elements) in order to obtain high descriptive power. By contrast, the described use of temporal support gives equal or better results using much smaller feature vocabularies (hundreds or thousands of elements), with a corresponding large increase in computational efficiency.

A second advantage is that for content-based retrieval applications, the described systems and methods allow retrieval of both an object of interest, and the context in which the object appears. The temporal sequence can be considered as additional information describing the object, in addition to the description of the object itself.

Figure 2:
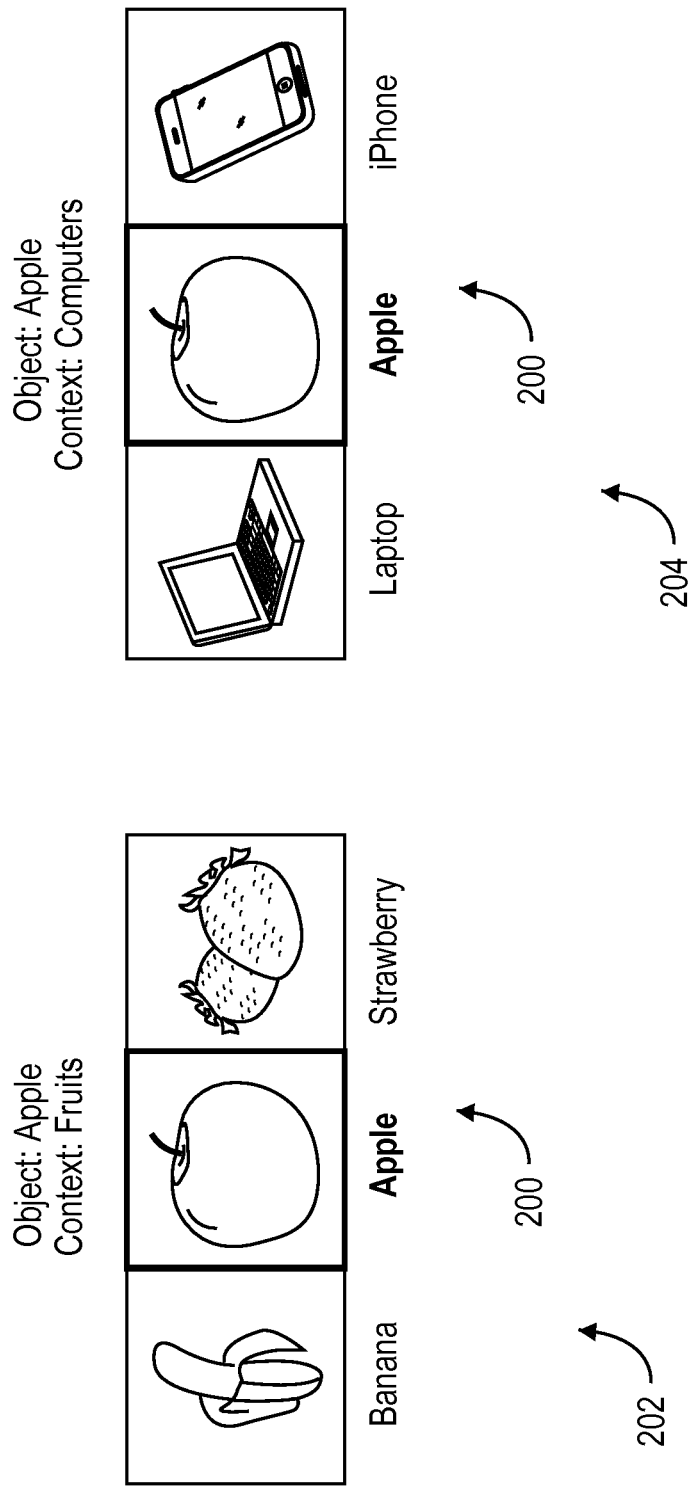
FIG. 2 shows an example context representation using video genomics.

FIG. 2 shows an example of the same object (an Apple 200) appearing in two different contexts: Fruits 202 and Computers 204. In the first case, the "Apple" object appears in a sequence with a Banana and a Strawberry, which places the object in the context of Fruits. In the second case, the Apple object appears in sequence with a Laptop and an iPhone, which places the object in the context of Computers. Here, the systems and methods are sophisticated enough to recognize these context differences. As a result, the Video map/Video DNA representation in these two cases will be different, despite the fact that the object itself is the same.

By contrast, prior art approaches, such as Sivic and Zisserman, do not take into consideration the context of the video content, and thus are unable to distinguish between the two different instances of the apple object in the above example.

A third advantage is that the described "Video genomics" approach allows for performing partial comparison and matching of video sequences in many different ways. Just as methods from bioinformatics allow different DNA sequences to be compared, two different video DNA sequences can be matched despite having some dissimilar video frames (nucleotides), insertions or gaps. This is especially important when invariance to video alterations such as temporal editing is required—for example, when the video DNAs of a movie and its version with inserted advertisements need to be matched correctly.

Figure 3:
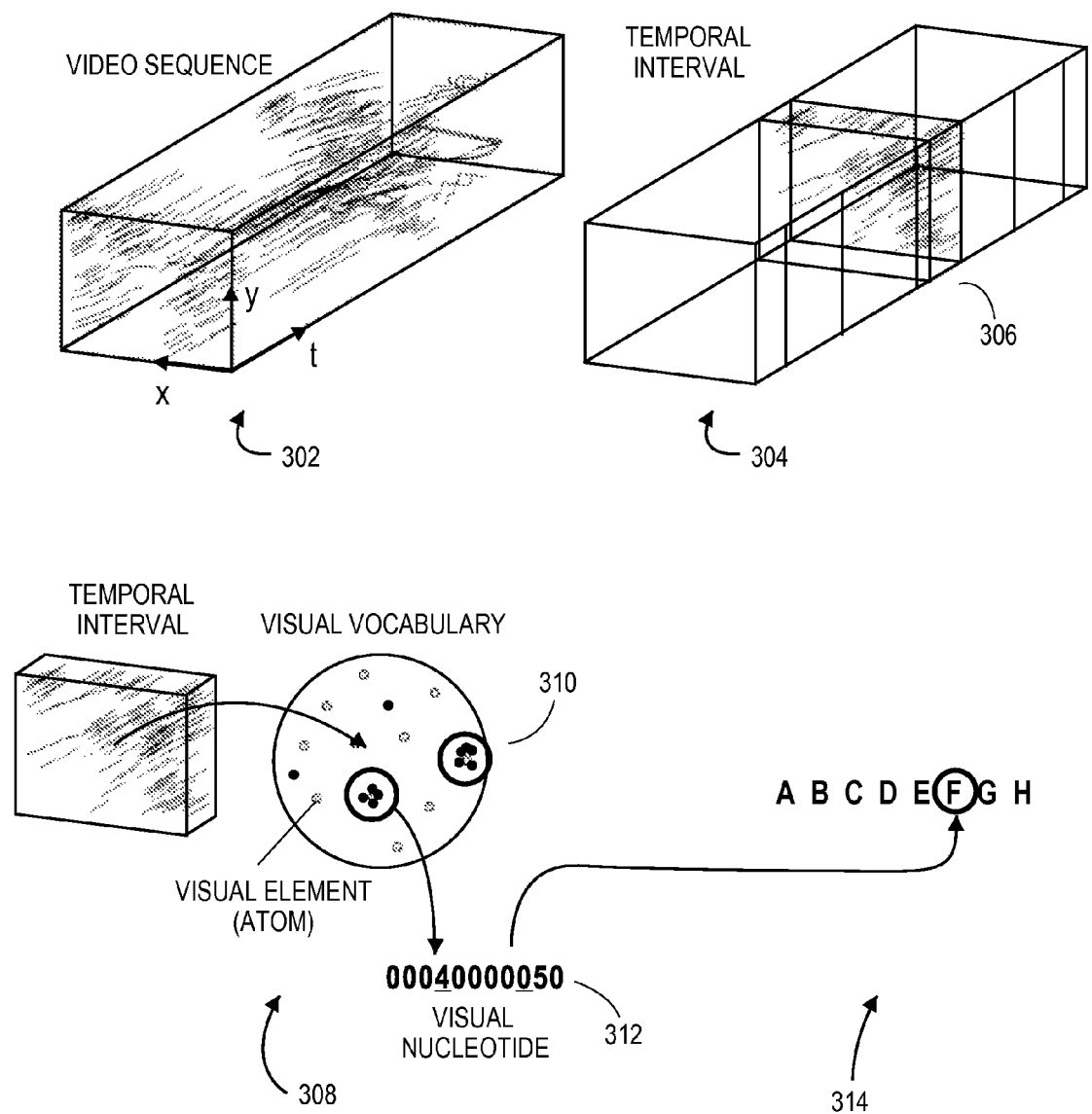
FIG. 3 shows example steps of video DNA formation.

FIG. 3 presents a conceptual scheme of an example creation of the video map/video DNA representation of a video sequence. The process consists of the following stages.

At a first stage 302, a local feature detector is used to detect points of interest in the video sequence. Suitable feature detectors include the Harris corner detector disclosed in C. Harris and M. Stephens "A combined corner and edge detector", Alvey Vision Conference, 1988; or the Kanade-Lucas algorithm, disclosed in B. D. Lucas and T. Kanade, "An iterative image registration technique with an application to stereo vision", 1981; or the SIFT scale-space based feature detector, disclosed in D. G. Lowe, "Distinctive image features from scale-invariant keypoints", IJCV, 2004.

The points of interest can be tracked over multiple video frames to prune insignificant or temporally inconsistent (e.g., appearing for a too short of a time period) points. This will be discussed in more detail later. The remaining points are then described using a local feature descriptor, e.g., SIFT based on a local distribution of gradient directions; or Speed up robust features (SURF) algorithm, described in H. Bay, T. Tuytelaars and L. van Gool, "Speed up robust features", 2006. The descriptor is represented as a vector of values.

The feature detection and description algorithms should be designed in such a way that they are robust or invariant to spatial distortions of the video sequence (e.g., change of resolution, compression noise, etc.) The spatio-temporal feature locations and the corresponding feature descriptors constitute the most basic representation level of the video sequence.

At a second stage 304, the video sequence is segmented into temporal intervals 306 which often span multiple individual video frames (often 3 to 30 frames). Such segmentation can be done, for example, based on the feature tracking from the previous stage. It should be noted that the segmentation is ideally designed to be rather invariant to modifications of the video such as frame rate change. Another way is to use time intervals of fixed size with some time overlap.

At a third stage 308, the features in each temporal interval are aggregated. As previously discussed, the spatio-temporal locations (feature coordinates) at this stage are not used. Rather, the information in the temporal interval is described using a "bag of features" approach 310.

Here, similarly to Sivic and Zisserman, all the feature descriptors are represented using a visual vocabulary (a collection of representative descriptors obtained, for example, by means of vector quantization). Each feature descriptor is replaced by the corresponding closest element in the visual vocabulary. As previously discussed, features represented in this way are also referred to herein as visual atoms. Continuing this analogy, the visual vocabulary can be thought of as a "periodic table" of visual elements.

Unlike the prior art approach of Sivic and Zisserman, however, here we discard the spatial coordinates of the features, and instead represent the frequency of appearance of different visual atoms in the temporal interval as a histogram (group or vector), which is referred to as a "representation", "visual nucleotide", "nucleotide" and occasionally "bag of features" 310. Here a "visual nucleotide 312 is essentially the "bag" of features created by discarding the spatial coordinates and just counting frequency of occurrence (this process is referred to as a "bag function" or "grouping function") that represents a certain number of video frames from the video. If a standardized set of visual elements is used to describe the contents of each "bag", then a visual nucleotide can be represented mathematically as a histogram or sparse vector. For example, if the "bag of features" describing several video images contains 3 cases of feature 1, 2 cases of feature 2, and 0 cases of feature 3, then the visual nucleotide or "bag" that describes these video images can be represented as the histogram or vector (3, 2, 0). In this example, the visual nucleotide (321) is represented as the histogram or vector (0, 0, 0, 4, 0, 0, 0, 0, 0, 5, 0).

The "bag of features" representation allows for invariance to spatial editing: if the video sequence is modified by, for example, overlaying pixels over the original frames, the new sequence will consist of a mixture of features (one part of old features belonging to the original video and another part of new features corresponding to the overlay). If the overlay is not very significant in size (i.e., most of the information in the frame belongs to the original video), it is possible to correctly match two visual nucleotides by requiring only a certain percentage of feature elements in the respective "bags" (i.e., sparse vectors) to coincide.

Finally, all the visual nucleotides (or feature bags) are aggregated into an ordered sequence referred to as a video map or video DNA 314. Each representation (or visual nucleotide, "bag", histogram or sparse vector) can be thought of as a generalized letter over a potentially infinite alphabet, and thus the video DNA is a generalized text sequence.

The temporal matching of two video sequences can be performed by matching the corresponding video DNAs using a variety of different algorithms. These can range from very simple "match/no match algorithms", to bioinformatics-like "dot matrix" algorithms, to very sophisticated algorithms similar to those used in bioinformatics for matching of biological DNA sequences. Examples of some of these more complex bioinformatics algorithms include the Needleman-Wunsch algorithm, described in S. B Needleman, C. D Wunsch, "A general method applicable to the search for similarities in the amino acid sequence of two proteins", 1970; Smith-Waterman algorithm, described in T. F. Smith and M. S. Waterman, "Identification of common molecular subsequences", 1981; and heuristics such as Basic Local Alignment Search Tool (BLAST), described in S. F. Alschul et al., "Basic Local Alignment Search Tool", 1990.

Often, a suitable sequence matching algorithm will operate by defining a matching score (or distance), representing the quality of the match between two video sequences. The matching score comprises two main components: similarity (or distance) between the nucleotides and gap penalty, expressing to the algorithm the criteria about how critical it is to try not to "tear" the sequences by introducing gaps.

In order to do this, the distance between a nucleotide in a first video and a corresponding nucleotide in a second video must be determined by some mathematical process. That is, how similar is the "bag of features" from the first series of frames of one video similar to the "bag of features" from a second series of frames from a second video? This similarity value can be expressed as a matrix measuring how similar or dissimilar the two nucleotides are. In a simple example, it can be a Euclidean distance or correlation between the vectors (bags of features) representing each nucleotide. If one wishes to allow for partial similarity (which frequently occurs, particularly in cases where the visual nucleotides may contain different features due to spatial edits), a more complicated metric with weighting or rejection of outliers should be used. More complicated distances may also take into consideration the mutation probability between two nucleotides: two different nucleotides are more likely similar if they are likely to be a mutation of each other. As an example, consider a first video with a first sequence of video images, and a second video with the same first sequence of video images, and a video overlay. Clearly many video features (atoms or elements) in the bag describing the first video will be similar to many video features in the bag describing the second video, and the "mutation" here is those video features that are different because of the video overlay.

The gap penalty is a function accounting for the introduction of gaps between the nucleotides of a sequence. If a linear penalty is used, it is simply given as the number of gaps multiplied by some pre-set constant. More complicated gap penalties may take into consideration the probability of appearance of a gap, e.g., according to statistical distribution of advertisement positions and durations in the content.

The following discussion identifies example similarities and differences between biological DNA and video DNA. Because the systems and methods discussed herein essentially transform the problem of matching corresponding portions of different video media into a problem that bears some resemblance to the problem of matching biological DNA sequences, some insight can be obtained by examining this analogy in more detail. Since DNA sequence matching art is in a comparatively advanced state of development, relative to video matching art, the systems and methods have the unexpected result of showing how a number of advanced DNA bioinformatics methodology techniques can be unexpectedly applied to the very different field of matching video signals.

As previously discussed, at the conceptual level, there is a strong similarity between the structure of biological DNA and the described video DNA methods. A biological DNA is a sequence composed of nucleotides, the same way as video DNA is composed of visual nucleotides (bags of features from multiple video frames). A nucleotide in biology is a molecule composed of atoms from a periodic table, the same way as a visual nucleotide is a bag of features composed of visual atoms (i.e., features) from the visual vocabulary (usually a standardized pallet of different features).

Figure 4:
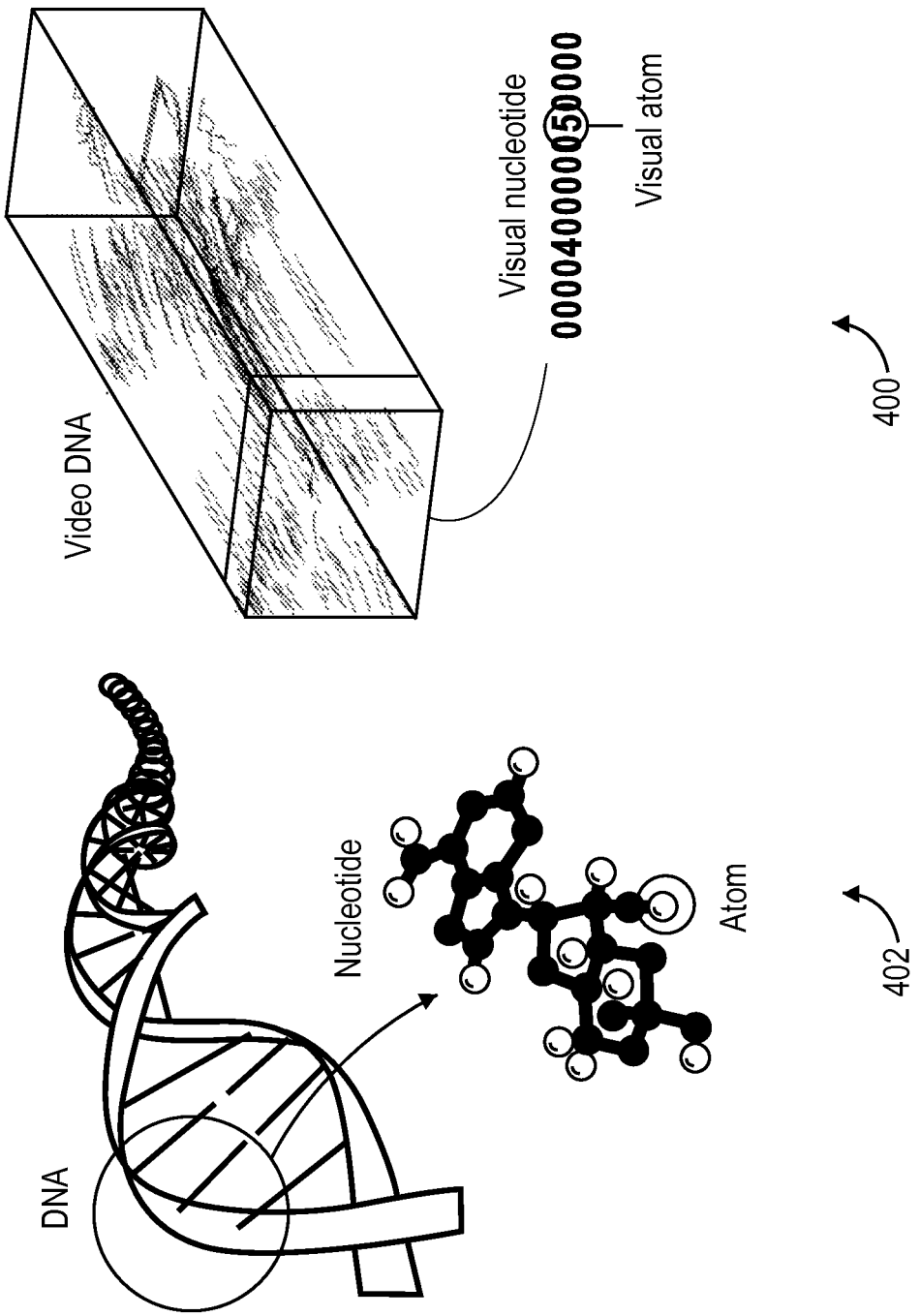
FIG. 4 shows an example comparison between biological DNA and video DNA.

FIG. 4 graphically shows the reason for the name "video DNA" by showing the analogy between an abstracted video signal 400, and the structure of a biological DNA molecule and its constituents (nucleotides and atoms) 402. Despite the conceptual similarity, the are many specific differences between the biological and video DNA. First, the size of the periodic table of atoms that appear in biological molecules is small, usually including only a few elements (e.g., Carbon, Hydrogen, Oxygen, Phosphorous, Nitrogen, etc.) In video DNA, the size of the visual vocabulary of features (atoms) is typically at least a few thousands up to a few millions of visual elements (features).

Second, the number of atoms in a typical nucleotide molecule is also relatively small (tens or hundreds). The number of "visual atoms" (features) in a visual nucleotide (bag of features) is typically hundreds or thousands. Whereas in a biological nucleotide, the spatial relationship and relationship between atoms is important, for a video nucleotide, this relationship (i.e., the feature coordinates) between features is de-emphasized or ignored.

Third, the number of different nucleotides in biological DNA sequences is small—usually four ("A", "T", "G", "C") nucleotides in DNA sequences and twenty in protein sequences. By contrast, in video DNA, each visual nucleotide is a "bag of features" usually containing at least hundreds of thousands of different features, and which can be represented as a histogram or vector. Thus, if a set or pallet of, for example, 500 or 1000 standardized features is used as a standard video analysis option, each "bag of features" would be a histogram or vector composed of the coefficients of how many times each one of these 500 or 1000 standardized features appeared in the series of video frames described by the "nucleotide" or "bag of features", so the number of permutations of this bag, each of which can potentially represent a different video nucleotide, is huge.

These factual differences make video DNA matching only similar in its spirit to biological sequence matching. In some aspects, the video matching problem is more difficult and in some respects it is easier. More specifically, the matching algorithms are different in the following aspects.

First, in biological sequences, since the number of different nucleotides is small, the score of matching two nucleotides can be represented as a simple "match", "don't match" result. That is, a biological nucleotide can be an "A", "T", "G" or "C", and there either is an "A" to "A" match, or there is not. By contrast, each nucleotide in video DNA is itself an array, histogram, vector or "bag of features" that often will have hundreds or thousands of different coefficients, and thus the matching operation is more complex. Thus, for video DNA, we need to use a more general concept of "score function" or "distance function" between nucleotides. This score can be thought of as some kind of distance function between histograms or vectors. In other words, how far apart are any two different "bags of features"?

Otherwise, many other concepts, such as homology scores, insertions, deletions, point-mutations, and the like have a remarkable resemblance between these two otherwise very different fields.

Figure 5:
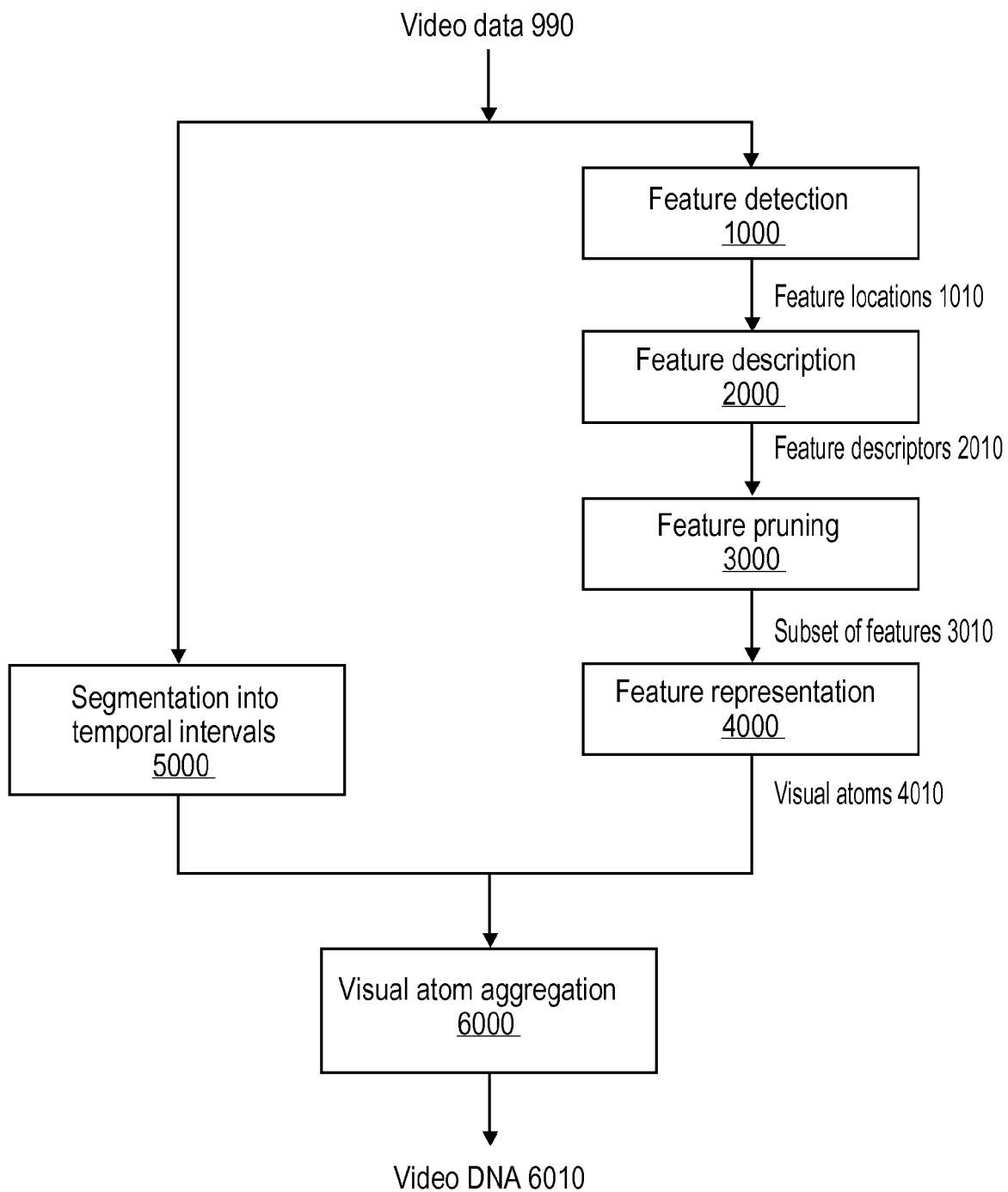
FIG. 5 depicts a flow diagram of an example method of video DNA construction.

In one embodiment, the video DNA of an input video sequence is computed as depicted in FIG. 5. The process of video DNA computation receives video data 990 and includes the following stages: feature detection 1000, feature description 2000, feature prunning 3000, feature representation 4000, segmentation into temporal intervals 5000 and visual atom aggregation 6000. The output of the process is a video DNA 6010. Some of the stages may be performed in different embodiments or not performed at all. The following description details different embodiments of the above stages of video DNA computation.

Segmentation into temporal intervals 5000. As shown in FIG. 6, the video sequence is divided into a set of temporal (time) intervals. FIG. 6 shows that in one embodiment, the video time intervals 600 are of fixed duration (e.g., 1 second) and non-overlapping. In another embodiment, time intervals 602 have some overlap. Here each video nucleotide could be composed from as many video frames as are present in one second (or a subset of this), which depending upon frame rate per second might be 10 frames, 16, frames, 24 frames, 30 frames, 60 frames, or some subset of this.

In another embodiment, the intervals are set at the locations of shot (scene) cuts or abrupt transition in the content of two consecutive frames (identified by reference numeral 604). It is possible to use the result of tracking to determine the shot cuts in the following way: at each frame, the number of tracks disappearing from the previous frame and new tracks appearing in the current frame is computed. If the number of disappearing tracks is above some threshold, and/or the number of new tracks is above some other threshold, the frame is regarded as a shot cut. If shot or scene cuts are used, a video nucleotide could be composed of as many video frames that are in the shot or scene cut, and this could be as high as hundreds or even thousands of video frames if the scene is very long. In another embodiment, the intervals are of constant duration and are resynchronized at each shot cut (identified by reference numeral 606).

Figure 7:
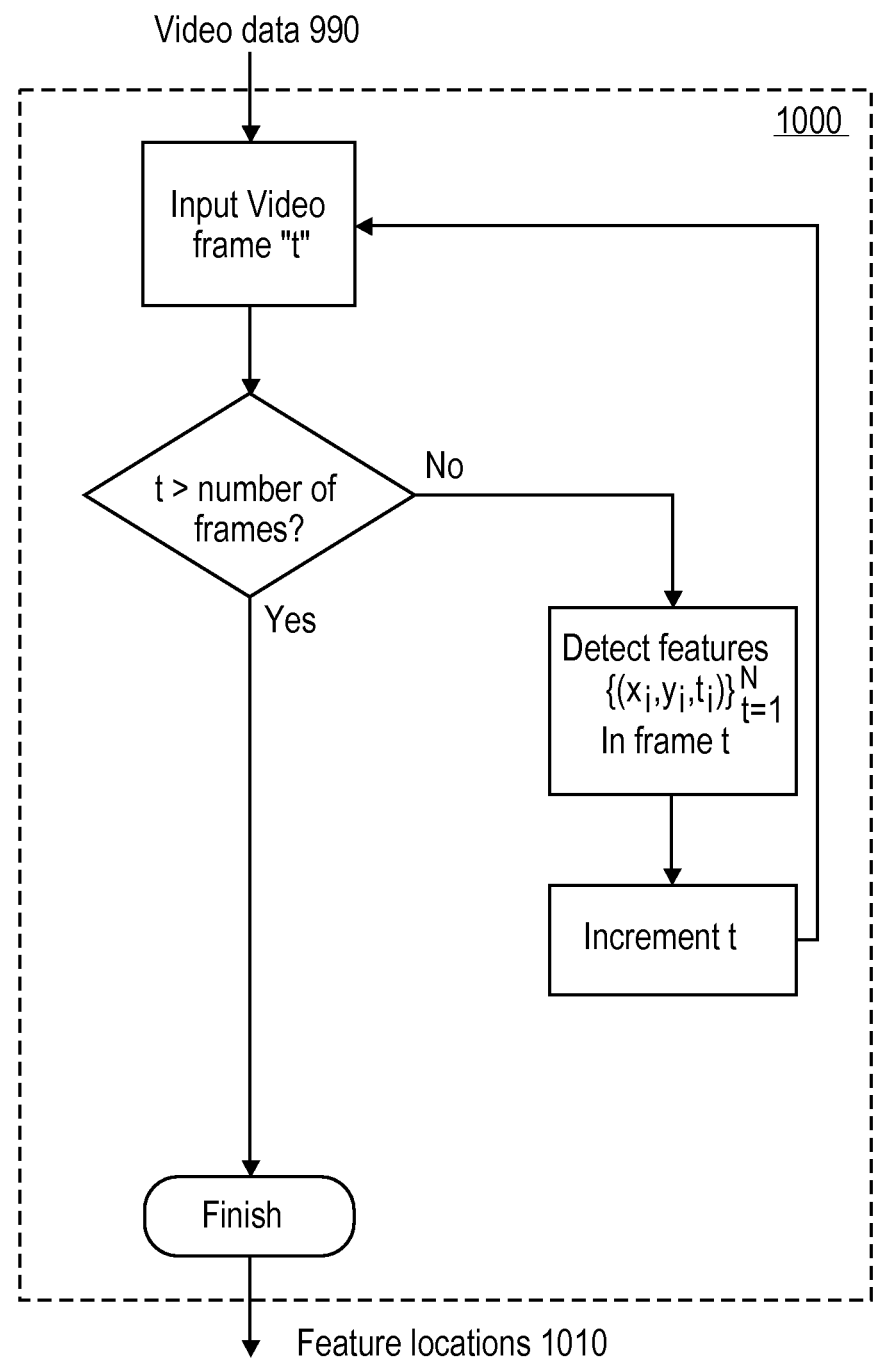
FIG. 7 depicts a flow diagram of an example method of frame based feature detection.

Feature detection (FIG. 5, 1000). A feature detector is operated on the video data 990, producing a set of N invariant feature point locations, $\{(x_i, y_i, t_i)\}_{i=1}^{N}$ (denoted by 1010 in FIG. 5) where x, y and t are the spatial and temporal coordinates of the feature point, respectively. Feature detection step 1000 is shown in more detail in FIG. 7, which shows one embodiment of this method. Feature detection 1000 is performed on a frame basis. For a frame at time t, a set of $N_t$ features $\{(x_i,y_i,t)\}_{i=1}^{N_t}$ is located. Typical features have the form of two-dimensional edges or corners. Standard algorithms for invariant feature point detection described in computer vision literature can be used. Such algorithms may include, for example, the Harris corner detector, scale-invariant feature transform (SIFT), Kanade-Lucas tracker, etc.

Typical values of $N_t$ range between tens to thousands. In particular embodiments, the values of $N_t$=100, 200, . . . , 1000 are used. In another embodiment, the value of $N_t$ is pre-set and is a result of feature detection algorithm used.

In another embodiment, the feature detection is performed on spatio-temporal data, producing a set $\{(x_i,y_i,t_i)\}_{i=1}^{N}$. Three-dimensional versions of standard feature detection algorithms may be used for this purpose.

Feature description (FIG. 5, 2000). For each feature point detected at feature description stage 2000, a feature descriptor is computed, producing a set of feature descriptors (denoted by 2010 in FIG. 5) $\{f_i\}_{i=1}^{N}$ corresponding to the feature points. A feature descriptor is a representation of the local video information in the neighborhood of the feature point. Many feature descriptors used in computer vision literature (e.g. SIFT or SURF feature descriptors) compute a local histogram of directed edges around the feature point. Typically, a feature descriptor can be represented as a vector of dimension F, i.e., $f_i \in R^F$. For example, for SIFT feature descriptor F=128, and for SURF feature descriptor, F=64.

In a particular embodiment, the feature descriptors are computed on a frame basis, meaning that they represent the pixels in the spatial neighborhood of a feature point within one frame. Standard feature descriptors such as SIFT or SURF can be used in this case.

In another embodiment, the feature descriptors are spatio-temporal, meaning that they represent the pixels in the spatio-temporal neighborhood. A three-dimensional generalization of standard feature descriptors can be used in this case.

Feature pruning (FIG. 5, step 3000). At this stage, among all the features, a subset 3010 of consistent features is found. In different embodiments, consistency may imply spatial consistency (i.e., that the feature point does not move abruptly and its position in nearby temporal locations is similar), temporal consistency (i.e., that a feature does not appear or disappear abruptly), or spatio-temporal consistency (a combination of the above).

Figure 8:
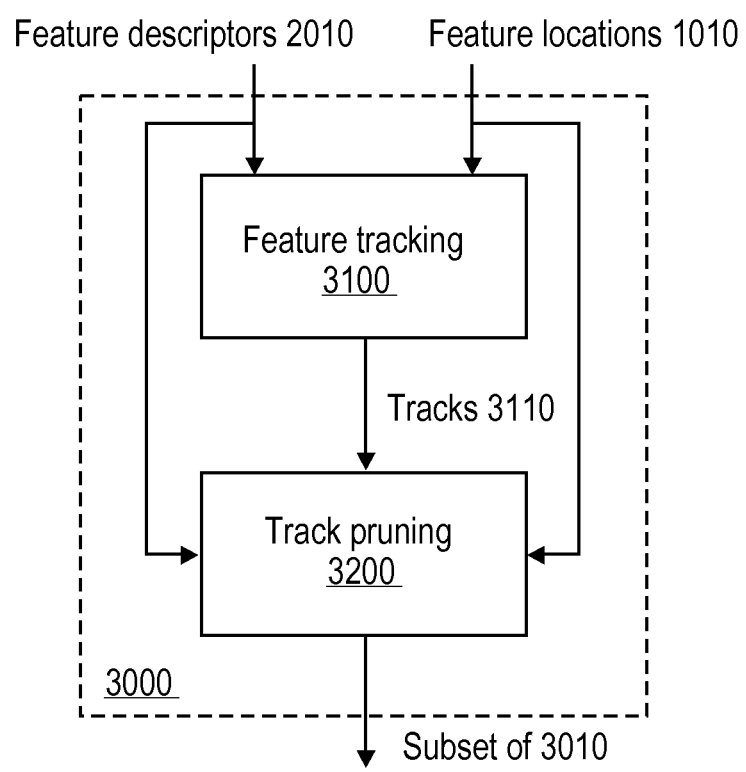
FIG. 8 depicts a flow diagram of an example method of feature tracking for finding consistent features.

In one embodiment, tracking is performed for finding consistent features as shown in FIG. 8. A feature tracking algorithm 3100 tries to find sets of features consistently present in a sufficiently large contiguous sequence of frames, thus removing spurious features detected in a single frame. Such spurious features are known to arise, for example, from specular reflections, and their removal improves the accuracy and discriminative power of the description of the visual content in a frame.

In one embodiment, a frame-based tracking is used. This type of tracking tries to find correspondence between two sets of features $\{(x_i,y_i,t)\}_{i=1}^{N_t}$ and $\{(x_j,y_j,t')\}_{j=1}^{N_{t'}}$ in frames t and t', where usually t'=t+1/fps for fps being the frame rate. In another embodiments, tracking is performed between multiple frames at the same time.

The output of the tracker 3100 is a set of T tracks 3110, each track representing a trajectory of a feature through space-time. A track can be represented as a set of indices of feature points belonging to this track. In one of the embodiments, a track is a set of indices of the form $\tau_k=\{(i_t,t)\}_{t=t_1}^{t_2}$, implying that a set of points $\{(x_i,y_i,t)\}_{t=t_1}^{t_2}$. $t_1$ and $t_2$ are the temporal beginning and end of the track, and $t_2-t_1$ is its temporal duration. Determining the tracks may based on feature similarity (i.e., the features belonging to the track have similar descriptors), motion (i.e., the locations of the feature points do not change significantly along the track), or both. Standard algorithms for feature tracking used in computer vision literature can be used.

The consistency of the resulting tracks is checked and track pruning 3200 is performed. In one embodiment, tracks of duration below some threshold are pruned. In another embodiment, tracks manifesting high variance of spatial coordinate (abrupt motions) are pruned. In another embodiment, tracks manifesting high variance of feature descriptors of feature points along them are pruned. The result of pruning is a subset T' of the tracks, $\{\tau_{k'}\}_{k'=1}^{T'}$.

In one of the embodiments, a set of features $\{(x_i,y_i,t)\}_{i=1}^{N}$ and the corresponding descriptors $\{f_i\}_{i=1}^{N}$ are computed in the beginning of a shot t, and the tracker is initialized to $x_i(t)=x_i, y_i(t)=y_i$, and a Kalman filter is used to predict the feature locations $\hat{x}_i(t'),\hat{y}_i(t')$ in the next frame t'. The set of features $\{(x'_j,y'_j,t')\}_{j=1}^{N'}$ with the corresponding descriptors $\{f'_j\}_{j=1}^{N'}$ computed in the frame t+dt. Each feature $x_i,y_i,f_i$ is matched against the subset of the features $x'_j,y'_j,f'_j$ in a circle with a certain radius centered at $\hat{x}_i(t'),\hat{y}_i(t')$, and the match with the closest descriptor is selected. When no good match is found for a contiguous sequence of frames, the track is terminated. Only features belonging to tracks of sufficient temporal duration are preserved.

In one embodiment, the Kalman filter is used with a constant velocity model, and the estimated feature location covariance determines the search radius in the next frame.

Figure 9:
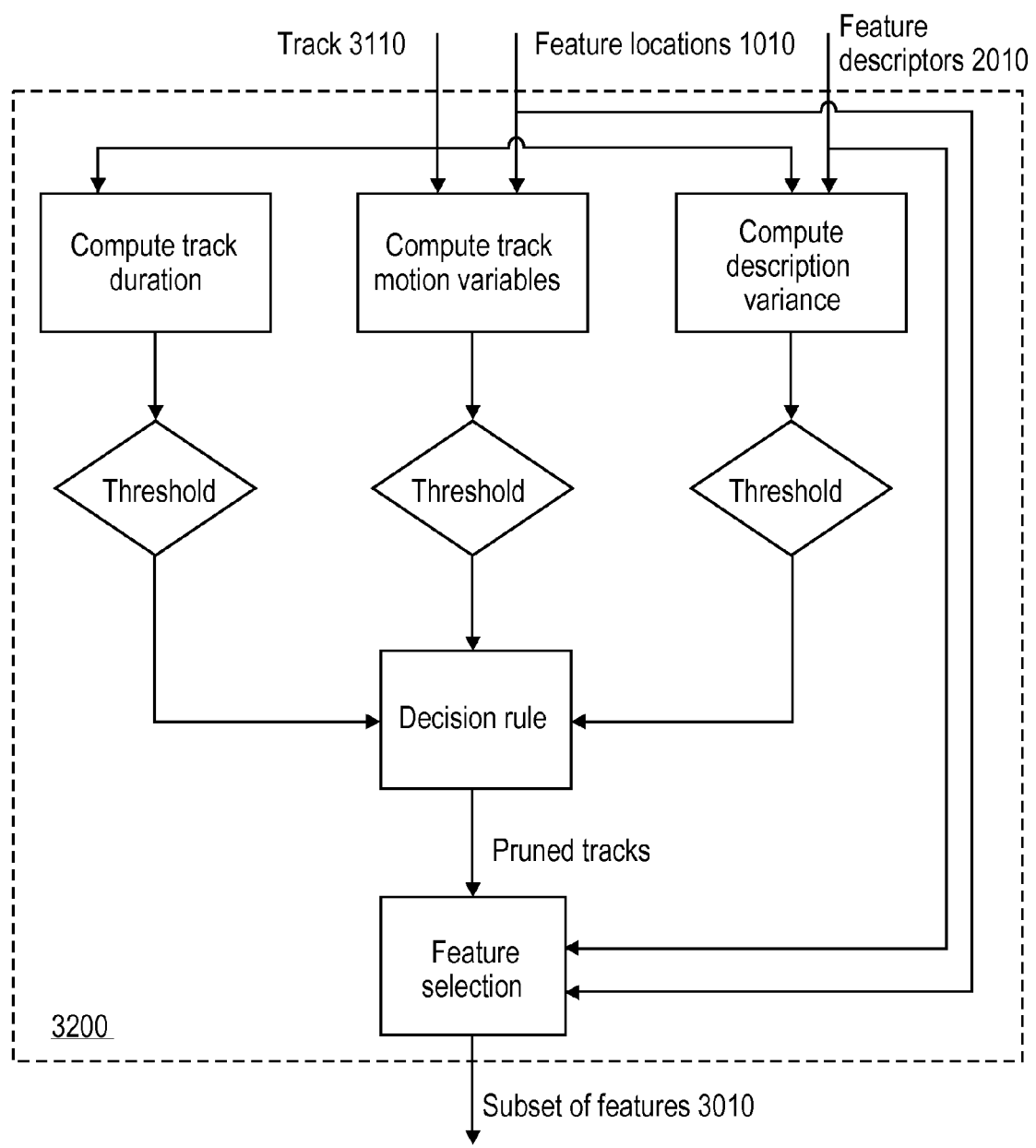
FIG. 9 depicts a flow diagram of an example method of feature track pruning.

One of the embodiments of feature pruning based on tracking previously shown in FIG. 8 (block 3200) is shown in more detail in FIG. 9. Inputting the feature locations 1010, corresponding feature descriptors 2010 and tracks of features 3110, for each track, the track duration "d", motion variance "mv" and descriptor variance "dv" are computed. These values go through a set of thresholds and a decision rule, rejecting tracks with too small duration and too large variance. The results is a subset of features 3010 belonging to tracks that survived the pruning.

One of the possible decision rules leaving the track is expressed as:

(d>th_d) AND (mv<th_mv) AND (dv<th_dv), where th_d is a duration threshold, th_mv is the motion variance threshold, and th_dv is the descriptor variance threshold.

Feature representation (FIG. 5, block 4000): Returning to FIG. 5, block 4000 shows the features on tracks remaining after pruning undergo representation using a visual vocabulary. The result of this stage is a set of visual atoms 4010.

The visual vocabulary is a collection of K representative feature descriptors (visual elements), denoted here by $\{e_l\}_{l=1}^{K}$. The visual vocabulary can be pre-computed, for example, by collecting a large number of features in a set of representative video sequences and performing vector quantization on their descriptors.

In different embodiments, values of K=1000, 2000, 3000, . . . , 1000000 are used.

Each feature i is replaced by the number l of the element from the visual vocabulary which is the closest to the descrip tor of feature i. In one of the embodiments, a nearest neighbor algorithm is used to find the representation of feature i, $$l = \arg\min_{l=1,\ldots,K} \|f_i - e_l\|,$$

where $\|\bullet\|$ is a norm in the descriptor space. In another embodiment, an approximate nearest neighborhood algorithm is used. As a result, feature i is represented as $(x_i, y_i, l_i)$, referred to as a visual atom.

In one embodiment, prior to representation of feature in a visual vocabulary, for each track a representative feature is found. It can be obtained by taking a mean, median or majority vote of the descriptors of the features along a track.

In one of the embodiments, non-discriminative features are pruned. A non-discriminative feature is such a feature which is approximately equally distant from multiple visual atoms. Such features can be determined by considering the ratio between the distance from the first and second closest neighbor.

Visual atom aggregation (6000): For each temporal interval computed at FIG. 5 block 5000, the visual atoms within it are aggregated into visual nucleotides. The resulting sequence of visual nucleotides (video DNA 6010) is the output of the process.

A visual nucleotide s is created as a histogram with K bins (K being the visual vocabulary size), nth bin counting the number of visual atoms of type n appearing in the time interval.

In one embodiment, the histogram in the interval $[t_s, t_e]$ is weighted by the temporal location of a visual atom within an interval according to the formula $$h_n = \sum_{i: l_i = n} w(t_i - t_s)$$

where $w(t)$ is a weight function, and $h_n$ is the value of the nth bin in the histogram. In one embodiment, the weight is set to its maximum value in the center of the interval, decaying towards interval edges, e.g. according to the Gaussian formula $$w(t) = \exp\left(-\frac{t^2}{2\sigma^2(t_e - t_s)^2}\right).$$

In another embodiment, shot cuts withing the interval $[t_s, t_e]$ are detected, and $w(t)$ is set to zero beyond the boundaries of the shot to which the center $$\frac{1}{2}(t_s + t_e)$$

of the interval belongs.

In a particular embodiment, the bins of the histogram are further weighted in order to reduce the influence of unreliable bins. For example, the weight of the nth bin is inversely proportional to the typical frequency of the visual atom of type n. This type of weighting is analogous to inverse document frequency (tf-idf) weighting in text search engines.

In another embodiment, the weight of the nth bin is inversely proportional to the variance of the nth bin computed on representative under typical mutations and directly proportional to the variance of the nth bin on the same content.

Once the video DNA has been computed for at least two video sequences, these different video sequences can then be matched (aligned) as to time, as described below. In one embodiment, the temporal correspondence between the query video DNA represented as the sequence $\{q_i\}_{i=1}^M$ of visual nucleotides, and a video DNA from the database represented as the sequence $\{s_j\}_{j=1}^N$ of visual nucleotides is computed in the following way.

In a matching between the two sequences, a nucleotide $q_i$ is brought into correspondence either with a nucleotide $s_j$, or with a gap between the nucleotides $s_j$ and $s_{j+1}$, and, similarly, a nucleotide $s_j$ is brought into correspondence either with a nucleotide $q_i$, or with a gap between the nucleotides $q_i$ and $q_{i-1}$. A matching between $\{q_i\}_{i=1}^M$ and $\{s_j\}_{j=1}^N$ can be therefore represented as a sequence of K correspondences $\{(i_k, j_k)\}_{k=1}^K$, a sequence of G gaps $\{(i_m, j_m, l_m)\}_{m=1}^G$ where $i_m, j_m, l_m$ represents the gap of length $l_m$ between the nucleotides $s_{j_m}$ and $s_{j_m+1}$ to which the sub-sequence $\{q_{i_m}, q_{i_m+1}, \ldots, q_{i_m+l_m}\}$ corresponds, and a sequence of G' gaps $\{(i_n, j_n, l_n)\}_{n=1}^{G'}$, where $(i_n, j_n, l_n)$ represents the gap of length $l_n$ between the nucleotides $q_{i_n}$ and $q_{j_n+1}$ to which the sub-sequence $\{s_{j_n}, s_{j_n+1}, \ldots, s_{j_n+l_n}\}$ corresponds. A match is assigned a score according to the formula $$S = \sum_{k=1}^{K} \sigma(q_{i_k}, s_{j_k}) + \sum_{m=1}^{G} g(i_m, j_m, l_m) + \sum_{n=1}^{G'} g(i_n, j_n, l_n)$$

where $\sigma(q_{i_k}, s_{j_k})$ quantifies the score of the nucleotide $q_{i_k}$ corresponding to the nucleotide $s_{j_k}$, and $g(i_m, j_m, l_m)$ is the gap penalty.

As previously discussed, many alternative algorithms may be used to compute matching, ranging from simple to extremely complex. In one embodiment of the invention, the Needleman-Wunsch algorithm is used to find the matching by maximizing the total score S. In another embodiment, the Smith-Waterman algorithm is used. In yet another embodiment, the BLAST algorithm is used.

In an alternate embodiment, the matching maximizing the total score S is done in the following way. In the first stage, good matches of a small fixed length W between the query and sequence in the database are searched for. These good matches are known as seeds. In the second stage, an attempt is made to extend the match in both directions, starting at the seed. The ungapped alignment process extends the initial seed match of length W in each direction in an attempt to boost the alignment score. Insertions and deletions are not considered during this stage. If a high-scoring un-gapped alignment is found, the database sequence passes on to the third stage. In the third stage, a gapped alignment between the query sequence and the database sequence can be performed using the Smith-Waterman algorithm.

In one embodiment of the invention, the gap penalty is linear, expressed by $g(i_m, j_m, l_m) = \alpha l_m$ where $\alpha$ is a parameter. In another embodiment, the gap penalty is affine, expressed by $g(i_m, j_m, l_m) = \beta + \alpha(l_m - 1)$ where $\beta$ is another parameter.

In an embodiment, the score function $\sigma(q_{i_k}, s_{j_k})$ describes the similarity between the histogram h representing the nucleotide $q_{i_k}$ and the histogram h' representing the nucleotide $s_{j_k}$. In another embodiment, the similarity is computed as the inner product $\langle h, h' \rangle$. In alternate embodiments, the inner product is weighted by a vector of weight computed from training data to maximize the discriminative power of the score function.

Alternatively, the score function $\sigma(q_{i_k}, s_{j_k})$ is inversely proportional to the distance between the histogram h representing the nucleotide $q_{i_k}$ and the histogram h' representing the nucleotide $s_{j_k}$. In other embodiments, the distance is computed as the Lp norm $$\|h - h'\|_p = \left(\sum_n (h_n - h'_n)^p\right)^{1/p}.$$

In a specific embodiment, the distance is the Kullback-Leibler divergence between the histograms. In other embodiments, the distance is the earth mover's distance between the histograms.

In a particular implementation, the score function $\sigma(q_{i_k}, s_{j_k})$ is proportional to the probability of a nucleotide $s_{j_k}$ mutating into a nucleotide $q_{i_k}$ by a spatial or temporal distortion applied to the underlying video sequence. This, in turn, can be expressed as the probability of the histogram h representing the nucleotide $q_{i_k}$ being the mutation of the histogram h' representing the nucleotide $s_{j_k}$.

In one example, the probability is estimated as $$P(h \mid h') = \prod_n P(h_n \mid h'_n),$$

where $P(h_n \mid h'_n)$ is the probability that the nth bin of the histogram h' changes its value to $h_n$. The probabilities $P(h_n \mid h'_n)$ are measured empirically on the training data, independently for each bin.

In another example, the Bayes theorem is used to represent the score function $\sigma(q_{i_k}, s_{j_k})$ as the probability $$P = (h' \mid h) = \frac{P(h \mid h')P(h')}{P(h)}$$

where $P(h \mid h')$ is computed as explained previously, and $P(h)$ and $P(h')$ are expressed as $$P(h) = \prod_n P_n(h_n)$$

$$P(h') = \prod_n P_n(h'_n)$$

where $P_n(h_n)$ measures the probability of the nth bin of the histogram h assuming the value of $h_n$, and is estimated empirically from the training data, independently for each bin.

Often it is useful not only to find the overall frame or time alignment between two different videos, but also to find the alignment between a first "thing" (group of pixels) in one spatial alignment in one video, and a second corresponding "thing" with a second spatial alignment in a second video. Alternatively, sometimes it is useful to compare videos that have been taken with different orientations and resolutions. For example, a user photographing a television screen using a handheld video taken with a cell phone may wish to determine exactly what television show or movie was being played. In both cases, it is useful to determine the spatial alignment between two different videos, as well as the time (frame number) alignment.

In one embodiment of the present invention, the spatial correspondence between the visual nucleotide $q_i$ representing the temporal interval $[t_s, t_e]$ in the query sequence, and the best matching visual nucleotide $s_j$ representing the temporal interval $[t'_s, t'_e]$ in the database sequence is computed in the following way.

In this embodiment, a frame is picked out of the interval $[t_s, t_e]$ and represented as a set of features $\{x_i, y_i\}_{i=1}^N$ with the corresponding descriptors $\{f_i\}_{i=1}^N$. Another frame is picked out of the interval $[t'_s, t'_e]$ and represented as a set of features $\{x'_j, y'_j\}_{j=1}^{N'}$ with the corresponding descriptors $\{f'_j\}_{j=1}^{N'}$. A correspondence is found between the two sets in such a way that each $f_i$ is matched to the closest $f'_j$. Insufficiently close matches are rejected. The corresponding points are denoted by $\{x_{i_k}, y_{i_k}\}, \{x'_{j_k}, y'_{j_k}\}$.

Once this correspondence is found, a transformation T is found by minimizing $$\min_T \|T(x_{i_k}, y_{i_k}) - (x'_{j_k}, y'_{j_k})\|.$$

In one embodiment, the minimization is performed using a RANSAC (random sample consensus) algorithm. In another embodiment, the minimization is performed using the iteratively-reweighted least squares fitting algorithm.

Often it will be useful to perform rotation, size, or distortion transformations.

In one of the embodiments, the transformation T is of the form $$T = \begin{pmatrix} \cos\theta & \sin\theta & u \\ -\sin\theta & \cos\theta & v \\ 0 & 0 & 1 \end{pmatrix}.$$

In another embodiment, the transformation T is of the form $$T = \begin{pmatrix} \cos\theta & \sin\theta & u \\ -\alpha\sin\theta & \alpha\cos\theta & v \\ 0 & 0 & 1 \end{pmatrix}.$$

In another embodiment, the transformation T is of the form $$T = \begin{pmatrix} a & b & u \\ c & d & v \\ 0 & 0 & 1 \end{pmatrix}.$$

In another embodiment, the transformation T is a projective transformation.

Figure 10:
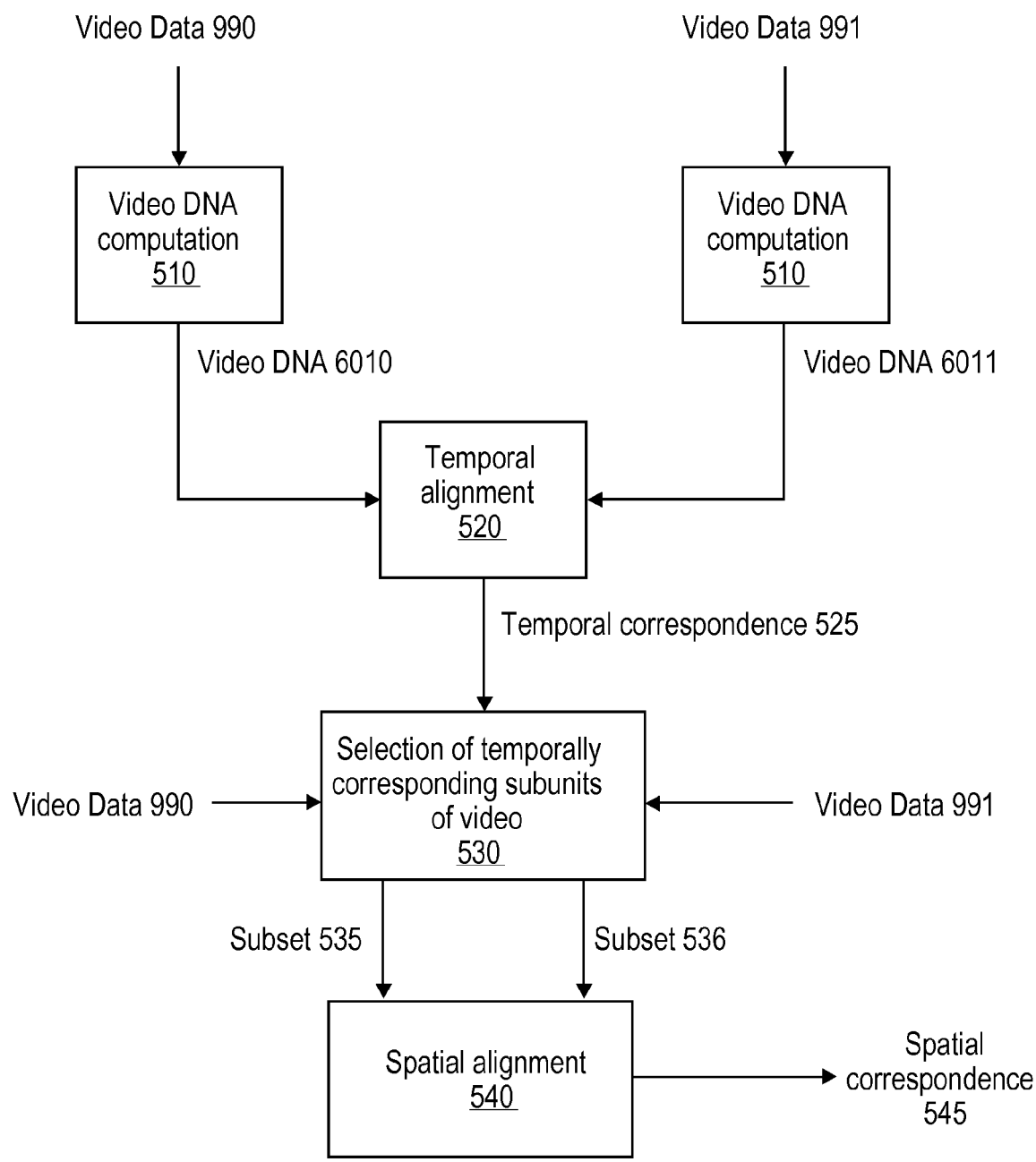
FIG. 10 depicts a flow diagram of an example method of finding spatio-temporal correspondence between two video DNA sequences.

Finding of spatio-temporal correspondence between two sequences is depicted in FIG. 10. The process consists of the following stages:

1. Video DNA computation. Two sets of video data 990 and 991 are inputted into a video DNA computation stage 510. Stage 510 was shown in more detail in FIG. 5 as steps 1000, 2000, 3000, 4000, and in FIGS. 11 to 14. This stage can be performed on-line, or pre-computed and stored.
2. Temporal matching. The resulting video DNAs 6010 and 6011 are inputted into a temporal alignment stage 520, which computes a temporal correspondence 525. The temporal correspondence is essentially a transformation from the temporal system of coordinates of the video data 990, and that of the video data 991. Stage 520 is shown in more detail in FIG. 15.

3. Spatial matching. The temporal correspondence 525 is used at stage 530 of selection of temporally corresponding subsets of the video data 990 and 991. The selected subsets 535 and 536 of the video data 990 and 991, respectively, are inputted to a spatial alignment stage 540, which computes a spatial correspondence 545. The spatial correspondence is essentially a transformation from the spatial system of coordinates of the video data 990, and that of the video data 991.

In a particular example is discussed below, in which the video DNA of an input video sequence is computed as depicted in FIG. 5. The process of video DNA computation inputs video data 990 and includes the following stages: feature detection 1000, feature description 2000, feature pruning 3000, feature representation 4000, segmentation into temporal intervals 5000 and visual atom aggregation 6000. The output of the process is a video DNA 6010.

Feature detection 1000: A SURF feature detector (described in "Speeded Up Robust Features", Proceedings of the 9th European Conference on Computer Vision, May 2006) is operated independently on each frame of the video sequence 990, producing a set of $N_f=150$ strongest invariant feature point locations (denoted by 1010 in FIG. 5) per each frame "t".

Feature description 2000: For each feature point detected at feature detection stage 1000, a 64-dimensional SURF feature descriptor is computed, as described in described in "Speeded Up Robust Features", Proceedings of the 9th European Conference on Computer Vision, May 2006.

Feature pruning 3000: This is an optional step which is not performed in this example.

Feature representation 4000: The features are represented in a visual vocabulary consisting of K=1000 entries. The representative elements are computed using the approximate nearest neighbor algorithm described in S. Arya and D. M. Mount, "Approximate Nearest Neighbor Searching", Proc. 4th Ann. ACM-SIAM Symposium on Discrete Algorithms (SODA'93), 1993, 271-280. Only features whose distance to the nearest neighbor is below 90% of the distance to the second nearest neighbor are kept. The result of this stage is a set of visual atoms 4010.

The visual vocabulary for the feature representation stage is pre-computed from a sequence of 750,000 feature descriptors obtained by applying the previously described stages to a set of assorted visual context serving as the training data. A k-means algorithm is used to quantize the training set into 1000 clusters. In order to alleviate the computational burden, the nearest neighbor search in the k-means algorithm is replaced by its approximate variant as described in S. Arya and D. M. Mount, "Approximate Nearest Neighbor Searching", Proc. 4th Ann. ACM-SIAM Symposium on Discrete Algorithms (SODA'93), 1993, 271-280.

Segmentation into temporal intervals 5000: The video sequence is divided into a set of fixed temporal intervals of fixed duration of 1 sec, (see FIG. 6, reference numeral 600).

Visual atom aggregation 6000: For each temporal interval computed at stage 5000, the visual atoms within it are aggregated into visual nucleotides. The resulting sequence of visual nucleotides (video DNA 6010) is the output of the process. A visual nucleotide is created as a histogram with K=1000 bins, nth bin counting the number of visual atoms of type n appearing in the time interval.

After the video DNA for two different or more different videos is produced, the video DNA from these materials may then be checked for correspondence, and matched as follows:

Temporal matching (see FIG. 10, reference numeral 520) can be performed using the SWAT (Smith-Waterman) algorithm with an affine gap penalty with the parameters $\alpha=5$ and $\beta=3$. The weighted score function $$\sigma(h, h') = \frac{\sum_{n=1}^{1000} h_n w_n h'_n}{\sqrt{\sum_{n=1}^{1000} w_n (h_n)^2} \sqrt{\sum_{n=1}^{1000} w_n (h'_n)^2}}$$

is used.

The weights $w_n$ can be computed empirically. For that purpose, various training video sequences can be transformed using a set of random spatial and temporal deformations, including blurring, resolution, aspect ratio, and frame rate changes, and its video DNA can be computed. The variance of each bin in the visual nucleotides, as well as the variance each bin in the corresponding visual nucleotides under the deformations are estimated. For each bin n, the weight $w_n$ is set to be ratio between the latter two variances. Spatial matching (see FIG. 10, reference numeral 540): The spatial alignment can be done between two 1 sec corresponding intervals of features representing the two sets of video data 990 and 991, where the correspondence is obtained from the previous temporal alignment stage 520. For each feature in one interval, the corresponding feature in the other interval is found by minimizing the Euclidean distance between their respective descriptors. The output of the process is two sets of corresponding features $\{(x_i, y_i, t_i)\}$, $\{(x'_i, y'_i, t'_i)\}$ Once the correspondence is found, a transformation of the form $$T = \begin{pmatrix} a & b & u \\ -b & c & v \\ 0 & 0 & 1 \end{pmatrix}$$

Can be found between the corresponding sets using the RANSAC algorithm.

Another way to view the at least one aspect of the invention is that it is a method of spatio-temporal matching of digital video data that includes multiple temporally matching video frames. In this view, the method consists of the steps of performing temporal matching on the digital video data that includes the plurality of temporally matching video frames to obtain a similarity matrix, where the spatial matching represents each of the video frames using a representation that includes a matching score, a similarity component, and a gap penalty component, and the representation is operated upon using a local alignment algorithm (such as one based upon a bioinformatics matching algorithm, or other suitable algorithm); and performing spatial matching on the digital video data that includes the plurality of temporally matching video frames obtained using the similarity matrix. Here the step of performing spatial matching is substantially independent from the step of performing temporal matching.

The above method could use a Needleman-Wunsch algorithm, a Smith-Waterman algorithm or similar type of algorithm. The above method can be also be implemented with a bioinformatics matching algorithm such as a basic local alignment search tool used to compare biological sequences or a protein or nucleotides DNA sequencing like algorithm.

The above method may further include performing local feature detection on the digital video data that includes the plurality of temporally matching video frames to detect points of interest; and using the points of interest to segment the digital video data that includes the plurality of temporally matching video frames into a plurality of temporal intervals; and wherein the step of performing temporal matching and performing spatial matching operate upon the plurality of temporal intervals.

In another aspect, the method may determine spatio-temporal correspondence between video data, and include steps such as: inputting the video data; representing the video data as ordered sequences of visual nucleotides; determining temporally corresponding subsets of video data by aligning sequences of visual nucleotides; computing spatial correspondence between temporally corresponding subsets of video data; and outputting the spatio-temporal correspondence between subsets of the video data.

Types of input data: With respect to this other aspect the video data may be a collection of video sequences, and can also be query of video data and corpus video data, and can also comprise subsets of a single video sequence or modified subsets of a video sequence from the corpus video data. Still further, the spatio-temporal correspondence can be established between at least one of the subsets of at least one of the video sequences from the query video data and at least one of subsets of at least one of the video sequences from the corpus video data. In a specific implementation, the spatio-temporal correspondence can be established between a subset of a video sequence from the query video data and a subset of a video sequence from the corpus video data.

With respect to the query video data mentioned above, the query can contain modified subsets of the corpus video data, and the modification can be a combination of one or more of the following
frame rate change;
spatial resolution change;
non-uniform spatial scaling;
histogram modification;
cropping;
overlay of new video content;
temporal insertion of new video content.

Nucleotide segmentation: In another variation, the described systems and method can also have the video data which are segmented into temporal intervals, and one visual nucleotide can be computed for each interval.

Interval duration: In another variation, the described systems and methods can also segment the video data into temporal intervals of constant duration or temporal intervals of variable duration. Temporal interval start and end times can also be computed according to the shot transitions in the video data. It is also noted that the temporal intervals may be non-overlapping or overlapping.

Visual nucleotide computation: In another variation, the visual nucleotide (the term used, as mentioned previously, to describe the visual content in a temporal interval of the video data) can also be computed using the following steps:
representing a temporal interval of the video data as a collection of visual atoms;
constructing the nucleotide as a function of at least one of the visual atoms.

With respect to this computation, the function may be a histogram of the appearance frequency of the features (visual atoms) in the temporal interval, or the function may be a weighted histogram of the appearance frequency of visual atoms in the temporal interval. If a weighted histogram, then the weight assigned to a visual atom can be a function of a combination of the following:
the temporal location of the visual atom in the temporal interval;
the spatial location of the visual atom in the temporal interval;
the significance of the visual atom.

Relative weight of different features or visual atoms in the nucleotide or "bag of features": In one implementation, the weight is constant over the interval (i.e., all features are treated the same). However in other implementations, the features may not all be treated equally. For example, in an alternative weighting scheme, the weight can be a Gaussian function with the maximum weight being inside the interval. The weight can also be set to a large value for the visual content belonging to the same shot as the center of the interval, and to a small value for the visual content belonging to different shots. Alternatively, the weight can be set to a large value for visual atoms located closer to the center of the frame, and to a small value for visual atoms located closer to the boundaries of the frame.

Visual atom methods: As described previously, the visual atom describes the visual content of a local spatio-temporal region of the video data. In one implementation, representing a temporal interval of the video data as a collection of visual atoms can include the following steps:
detecting a collection of invariant feature points in the temporal interval;
computing a collection of descriptors of the local spatio-temporal region of the video data around each invariant feature point;
removing a subset of invariant feature points and their descriptors;
constructing a collection of visual atoms as a function of the remaining invariant feature point locations and descriptors.

Feature detection methods: In addition to the feature detection methods previously described, the collection of invariant feature points in the temporal interval of the video data mentioned above may be computed using the Harris-Laplace corner detector or using the affine-invariant Harris-Laplace corner detector or using the spatio-temporal corner detector or using the MSER algorithm. If the MSER algorithm is used, it can be applied individually to a subset of frames in the video data or can be applied to a spatio-temporal subset of the video data. The descriptors of the invariant feature points mentioned above can also be SIFT descriptors, spatio-temporal SIFT descriptors, or SURF descriptors.

Tracking methods: In some embodiments, computing a collection of descriptors mentioned above can include: tracking of corresponding invariant feature points in the temporal interval of the video data, using methods such as:
computing a single descriptor as a function of the descriptors of the invariant feature points belonging to a track;
assigning the descriptor to all features belonging to the track.

This computing the function may be the average of the invariant feature points descriptors or the median of the invariant feature points descriptors.

Feature pruning methods: In some embodiments, removing a subset of invariant feature points as mentioned above can include:
tracking of corresponding invariant feature points in the temporal interval of the video data;
assigning a quality metric for each track;

removing the invariant feature points belonging to tracks whose quality metric value is below a predefined threshold.

In some embodiments, the quality metric assigned for a track as mentioned above may be a function of a combination of the following descriptor values of the invariant feature points belonging to the track;

locations of the invariant feature points belonging to the track.

The function may be proportional to the variance of the descriptor values or to the total variation of the invariant feature point locations.

Visual atom construction: In some embodiments, constructing a collection of visual atoms mentioned above may also be performed by constructing a single visual atom for each of the remaining invariant feature points as a function of the invariant feature point descriptor. The function computation may include:

receiving an invariant feature point descriptor as the input;

finding a representative descriptor from an ordered collection of representative descriptors matching the best the invariant feature point descriptor received as the input;

outputting the index of the found representative descriptor.

Finding a representative descriptor may be performed using a vector quantization algorithm or using an approximate nearest neighbor algorithm.

Visual vocabulary methods: The ordered collection of representative feature descriptors (visual vocabulary) may be fixed and computed offline from training data, or may be adaptive and updated online from the input video data. In some cases, it will be useful to construct a standardized visual vocabulary that operates either universally over all video, or at least over large video domains, so as to facilitate standardization efforts for large video libraries and a large array of different video sources.

Visual atom pruning methods: In some embodiments, constructing the collection of visual atoms mentioned above may be followed by removing a subset of visual atoms, and removing a subset of visual atoms may include:

assigning a quality metric for each visual atom in the collection;

removing the visual atoms whose quality metric value is below a predefined threshold.

The threshold value may be fixed or adapted to maintain a minimum number of visual atoms in the collection or adapted to limit the maximum number of visual atoms in the collection.

Further, the assigning the quality metric may include:

receiving a visual atom as the input;

computing a vector of similarities of the visual atom to visual atoms in a collection of representative visual atoms;

outputting the quality metric as a function of the vector of similarities. This function may be proportional to the largest value in the vector of similarities, proportional to the ratio between the largest value in the vector of similarities and the second-largest value in the vector of similarities or a function of the largest value in the vector of similarities and the ratio between the largest value in the vector of similarities and the second-largest value in the vector of similarities.

Sequence alignment methods: In some embodiments, the aligning sequences of visual nucleotides mentioned above may include receiving two sequences of visual nucleotides $s=\{s_1, \ldots, s_M\}$ and $q=\{q_1, \ldots, q_M\}$ as the input;

receiving a score function $\sigma(s_i,q_j)$ and a gap penalty function $\gamma(i,j,n)$ as the parameters;

finding the partial correspondence $C=\{(i_1,j_1), \ldots, (i_K,j_K)\}$ and the collection of gaps $G=\{(l_1,m_1,n_1), \ldots, (l_L,m_L,n_L)\}$ maximizing the functional $$F(C, G) = \sum_{k=1}^{K} \sigma(s_{i_k}, q_{j_k}) + \sum_{k=1}^{L} \gamma(l_k, m_k, n_k)$$

outputting the found partial correspondence C and the maximum value of the functional.

Other alignment methods: As previously discussed, the maximization may be performed using the Smith-Waterman algorithm, the Needleman-Wunsch algorithm, the BLAST algorithm or may be performed in a hierarchical manner.

Scoring methods: The score function mentioned above may be a combination of one or more functions of the form $$s_i^T A q_j;$$

$$\frac{s_i^T A q_j}{\sqrt{s_i^T A s_i} \sqrt{q_j^T A q_j}}.$$

wherein A may be an identity matrix, a diagonal matrix.

The score may also be proportional to the conditional probability $P(q_j|s_i)$ of the nucleotide $q_j$ being a mutation of the nucleotide $s_i$ and the mutation probability may be estimated empirically from training data.

The score may also be proportional to the ratio of probabilities $$\frac{P(q_j|s_i)P(s_i)}{P(q_j)}$$

And the mutation probability may be estimated empirically from training data.

Distance based scoring methods: Further, the score function may be inversely proportional to a distance function $d(s_i,q_j)$, and the distance function may be a combination of at least one of the following L1 distance;

Mahalanobis distance;

Kullback-Leibler divergence;

Earth Mover's distance.

Weighting schemes: In addition to the weighting schemes previously described, the diagonal elements of the matrix A may be proportional to $$\log \frac{1}{E_i}$$

where $E_i$ denotes the expected number of times that a visual atom i appears in a visual nucleotide.

$E_i$ may be estimated from training video data or from the input video data. And the diagonal elements of the matrix A may be proportional to $$\frac{v_i}{V_i}$$

where $v_i$ is the variance of the visual atom i appearing in mutated versions of the same visual nucleotide, and $V_i$ is the variance of the visual atom i appearing in any visual nucleotide.

Further, $v_i$ and $V_i$ may be estimated from training video data.

Gap penalty methods: In some embodiments, the gap penalty can be a parametric function of the form $\gamma(i,j,n;\theta)$, where i and j are the starting position of the gap in the two sequences, n is the gap length, and $\theta$ are parameters. The parameters may be estimated empirically from the training data, and the training data may consist of examples of video sequences with inserted and deleted content. Further, the gap penalty may be a function of the form: $\gamma(n)=a+bn$, where n is the gap length and a and b are parameters. Still further, the gap penalty may be a convex function or inversely proportional to the probability of finding a gap of length n starting at positions i and j in the two sequences.

Spatial correspondence methods: Methods of computing spatial correspondence may include:
  inputting temporally corresponding subsets of video data;
  providing feature points in subsets of video data;
  finding correspondence between feature points;
  finding correspondence between spatial coordinates.

Temporally corresponding subsets of video data may be at least one pair of temporally corresponding frames.

Further, finding correspondence between feature points further may include:
  inputting two sets of feature points;
  providing descriptors of feature points;
  matching descriptors;

The feature points may be the same as used for video nucleotides computation, and the descriptors may be the same as used for video nucleotides computation.

Also, finding correspondence between feature points may be performed using a RANSAC algorithm or consist of finding parameters of a model describing the transformation between two sets of feature points, wherein finding parameters of a model may be performed by solving the following optimization problem $$\theta^* = \arg\min_{\theta} T(\{(x_i, y_i)\}, \{(x_j, y_j)\}; \theta)$$

where $\{(x_i,y_i)\}$ and $\{(x_j,y_j)\}$ are two sets of feature points and T is a parametric transformation between sets of points depending on parameters $\theta$.

The correspondence between spatial coordinates may be expressed as a map between the spatial system of coordinates (x, y) in one subset of video data and spatial system of coordinates (x', y') in another subset of video data.

Output methods: the output spatio-temporal correspondence between subsets of video data may be represented as a map between the spatio-temporal system of coordinates (x, y, t) in one subset and spatio-temporal system of coordinates (x', y', t') in another subset.

In order to assist this discussion, a simplified series of cartoons is provided that show, in a very simplified graphic form, some of the previously discussed methods and techniques. Although this simplified series of cartoons is less precise than the more formal explanation previously provided, it is provided to make some of the previously described steps easier to follow and understand. Here, in order to assist in graphic visualization, what may normally be an array of 1000 or more features that is computed in a higher dimensional space has been simplified down to a 3-dimensional feature array, computed in three dimensional space. This allows the complex higher-dimensional math to be shown in a simplified graphical form. Additionally, the complex feature descriptors are shown in a simplified form that is suitable for black and white drawings.

Figure 11:
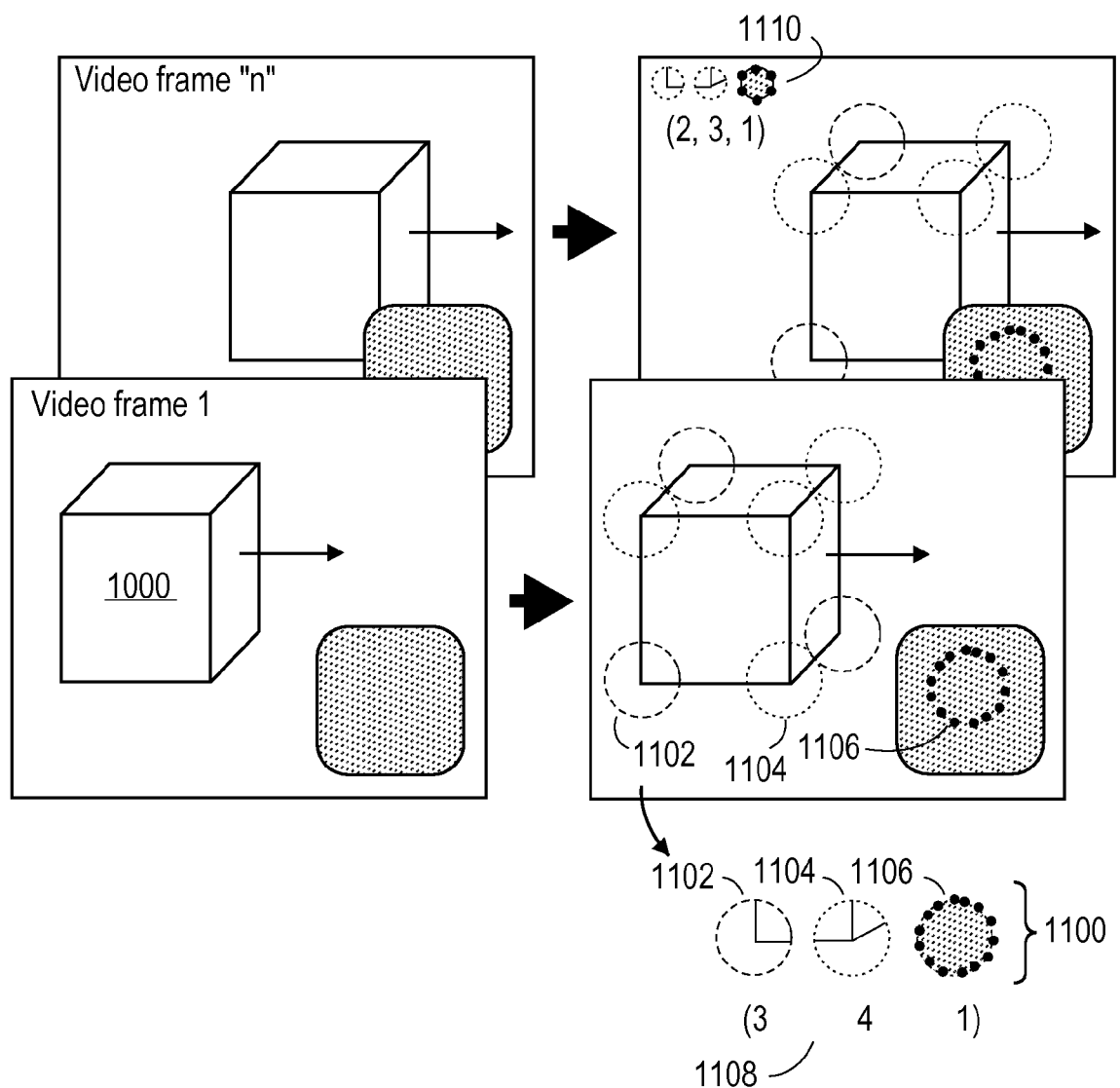
FIG. 11 shows an example of video signature feature detection.

FIG. 11, feature detection (1000) and feature description (2000): FIG. 11 shows a combination of FIG. 5, blocks 1000 and 2000. A simplified video nucleotide or signature can be created by analyzing video image frames using an array of different feature detection algorithms. In this example, the three different feature detection algorithms are a simple 2-edge corner detection algorithm 1102, a simple 3-edge corner detection algorithm 1104, and a dark smooth region detection algorithm 1106. A simple single-frame video nucleotide or signature 1108, 1110 can be created by summing the number of features detected by each different detection algorithm, and using these sums to form a histogram or vector "nucleotide". A simple multiple-frame video nucleotide or signature can be created by summing the number of features over a series of video frames. Due to noise however, the results from a single frame can vary. Thus, it often will be preferable to do this analysis over a series of video image frames, and employ various noise reduction and signal averaging techniques to produce a more robust video nucleotide or signature. This approach is shown in the next figure, FIG. 12.

Figure 12:
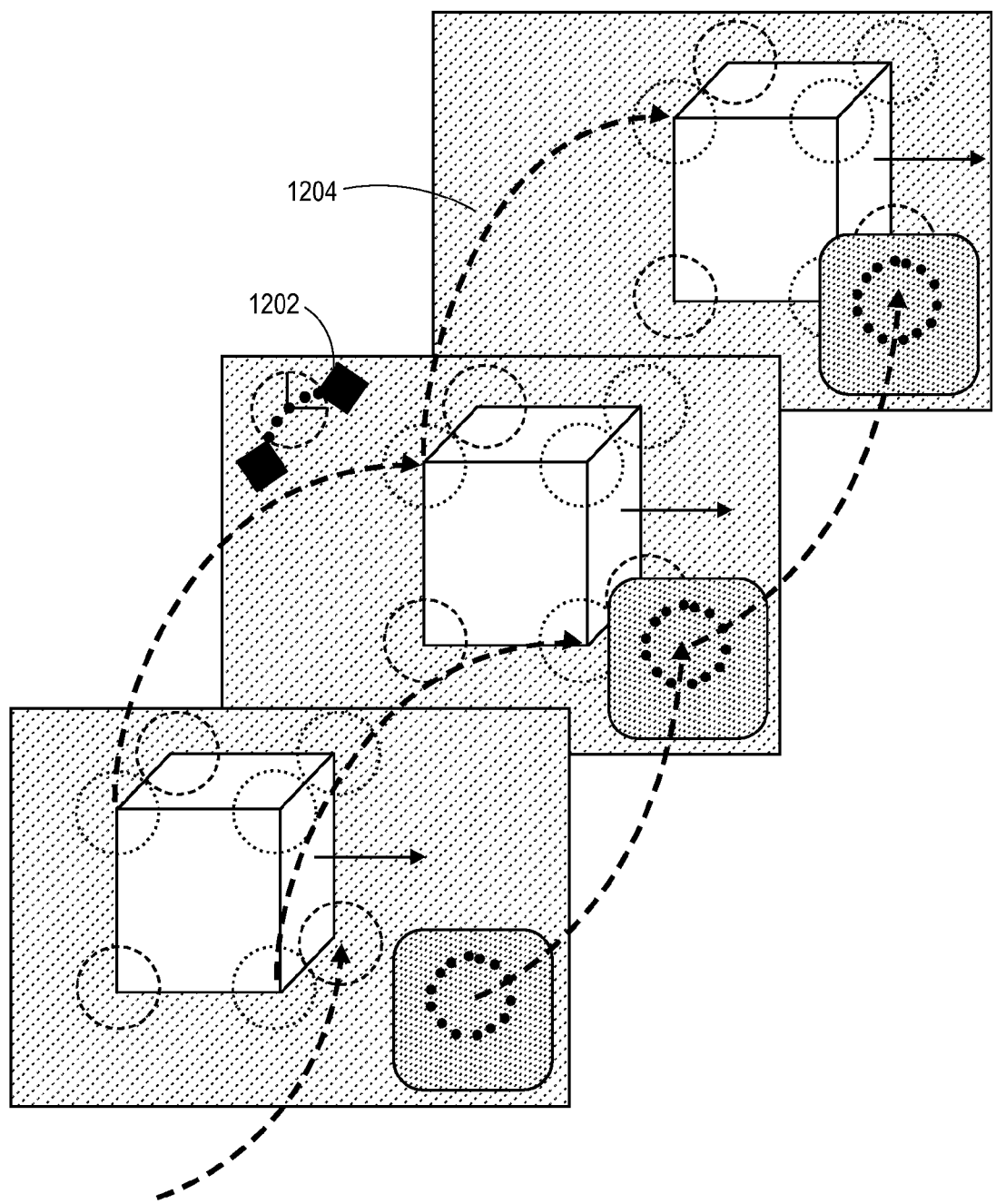
FIG. 12 shows an example of video signature feature pruning.

FIG. 12, feature pruning (3000): FIG. 12 shows a simplified version of FIG. 5 block 3000. Due to noise, often a video analysis will show the presence of transient features on one video image frame that do not show up on other video image frames. To reduce noise, it often is useful to analyze a series of video image frames, look for corresponding features between frames, and reduce noise by discarding transient features 1202. In this example, the dashed arrows 1204 show that the features are persistent between frames, while the feature shown with the dotted box 1202 is a transient feature that is present for that frame only, and will be discarded.

Figure 13:
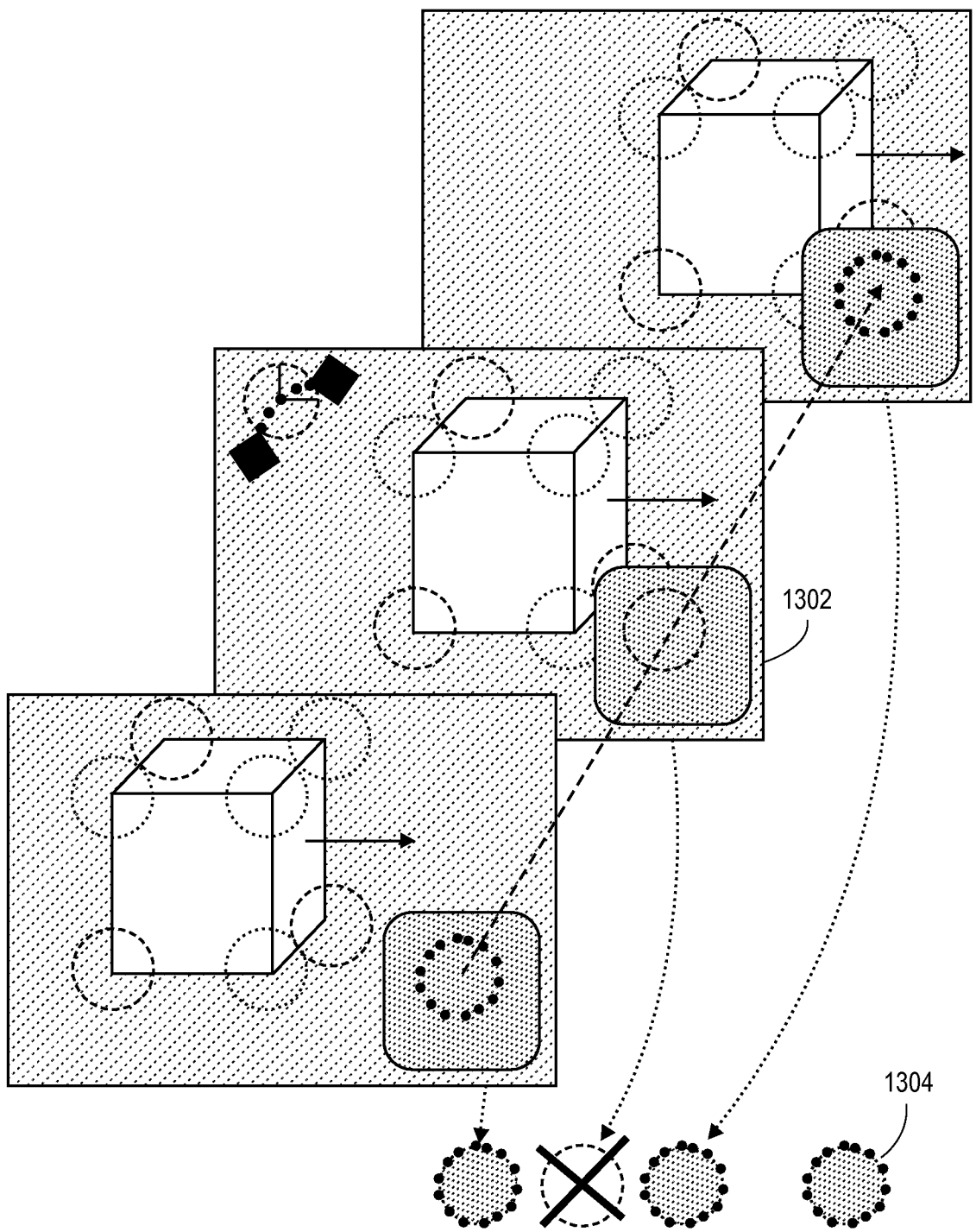
FIG. 13 shows an example of feature time-average representation.

FIG. 13, feature representation (4000): FIG. 13 shows a simplified version of FIG. 5 block 4000. Due to noise, often a video analysis will score the same persistent feature somewhat differently on a frame by frame basis (1302). To reduce noise, it often will be useful to track corresponding groups of pixels from frame to frame, compute the corresponding features in each frame, but then discard or deweight features reported by unusual frames (such as by a mean, median or majority analysis), and instead use the more commonly reported feature to describe this group of pixels. In this example, due to noise, the dark smooth edge detection algorithm correctly functioned in two out of three frames, but in the middle frame 1302, the group of pixels was incorrectly reported as a two corner feature, and as a result has been de-emphasized in favor of the consensus feature 1304.

Figure 14:
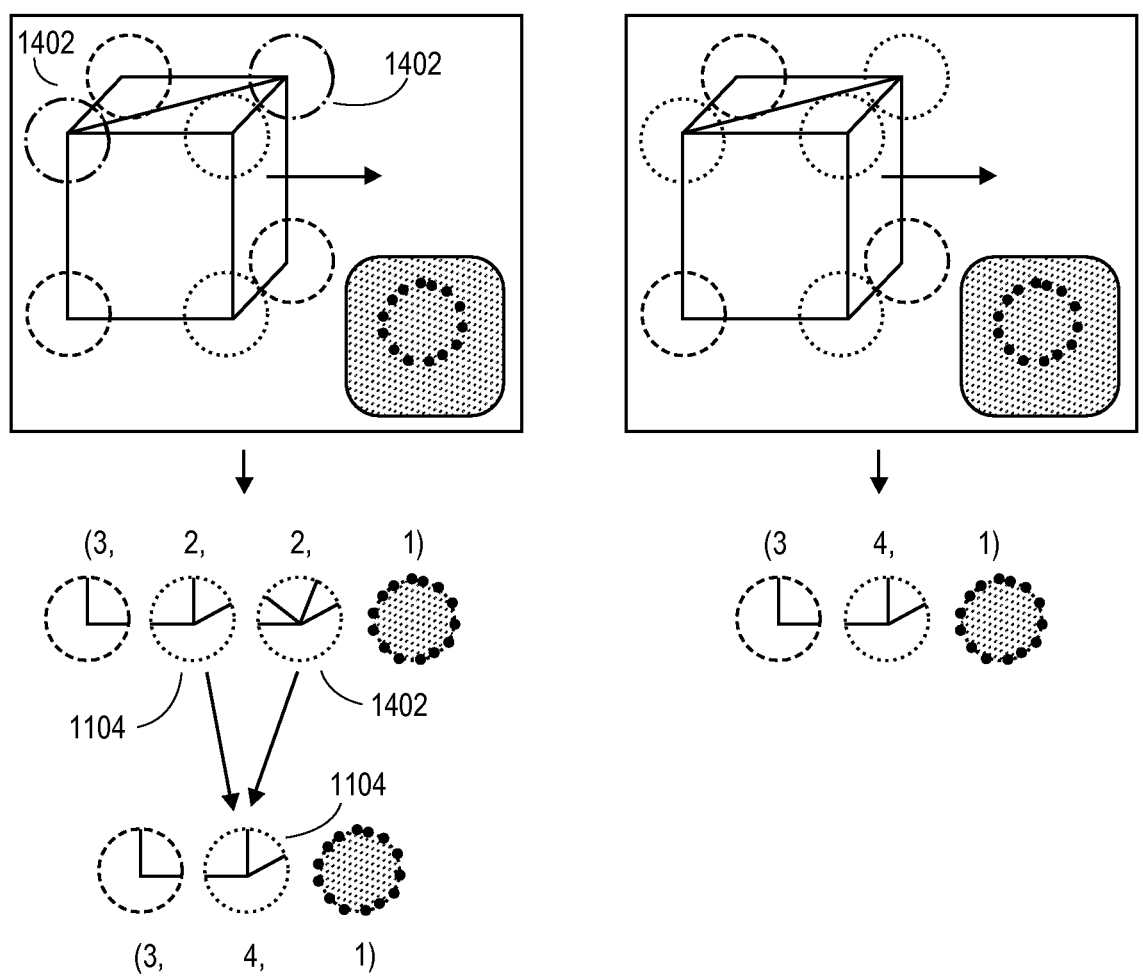
FIG. 14 shows an example of a video signature feature nearest neighbor fit.

FIG. 14, feature representation II (nearest neighbor fit), also block 4000: This figure shows a later event in FIG. 5. Even when a relatively large array (i.e., hundreds or thousands) of different feature detection algorithms are used to analyze video images, not all image features will fit neatly into each different feature algorithm type. Some image features will either not precisely fit into a specific feature algorithm, or else will have an ambiguous fit. In the nearest neighbor fit, the actual observed features are credited to the counter bin associated with the feature algorithm that most closely fits the observed feature. In this example, in one portion of the video, the top of the cube has a diagonal line that creates two different 4 corner edge features 1402. Since in this example, the feature algorithm that comes closest to matching a 4-corner edge feature is the 3-corner edge feature 1104, the nearest neighbor fit will credit the 4-corner edge to the 3-corner edge counter bin 1104.

Figure 15:
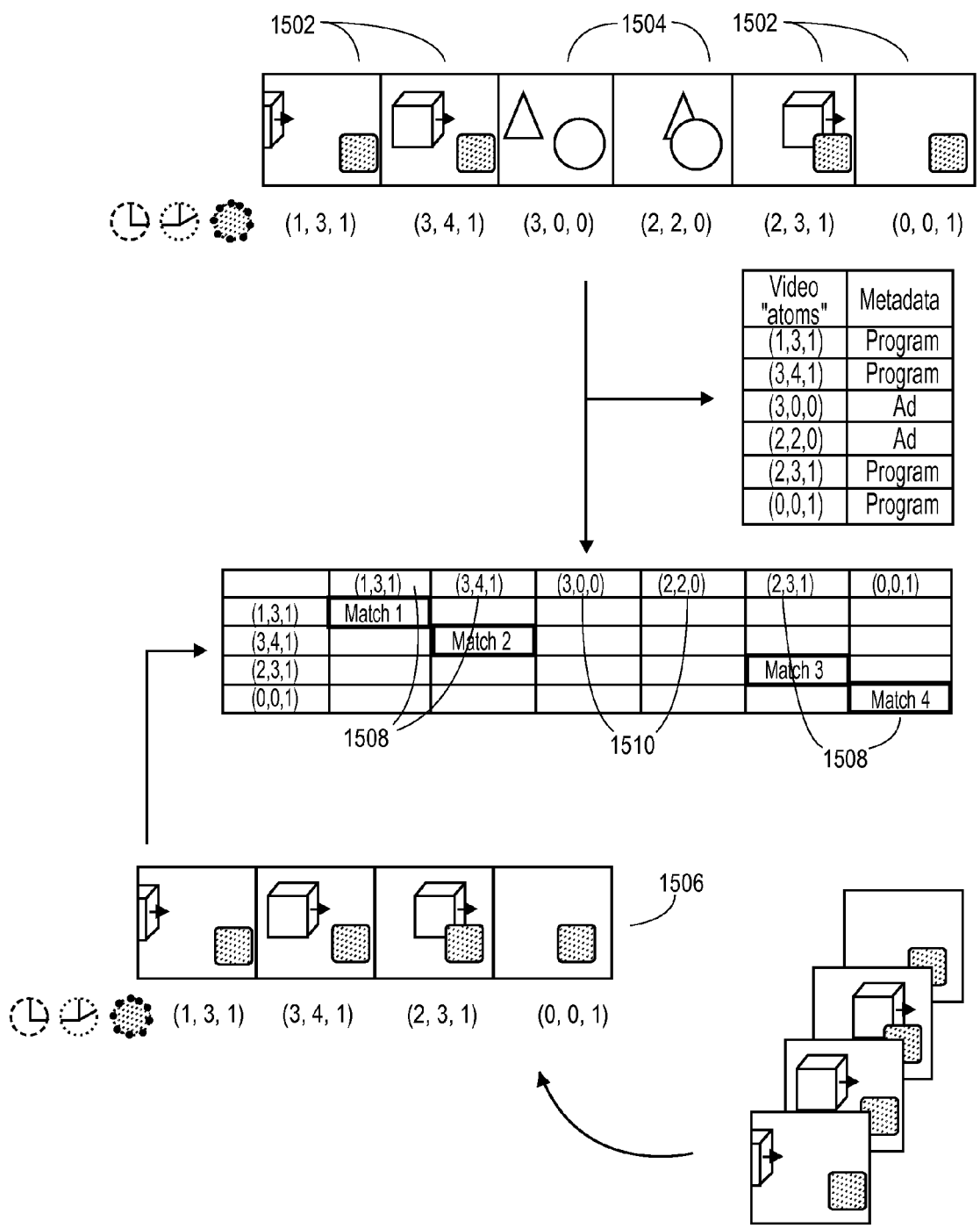
FIG. 15 shows an example of temporal alignment between two slightly different video signatures.

FIG. 15, temporal alignment: This figure shows a simplified version of the process shown in FIG. 10 (block 520). In order to determine the best match between an unknown video nucleotide or signature (often the nucleotide or signature of a 1 second long video segment), and a database comprised of a variety of different video nucleotides (often a series of video segments from the same video and other videos), the various nucleotides are matched, and the best fit is found. In this example, the unknown consists of video nucleotides of a video program 1502 (cubes) with a short advertisement clip (triangle and circle) 1504 inserted, and the database consists of the underlying video program without the advertisement 1506. The correspondence between the unknown video signal and the database can be found by computing various possible matches between the known and unknown video nucleotides, and finding which matches are closest (1508). Here the results show that there is a match between the portion of the video before the advertisement, and the portion of the video after the advertisement, but the advertisement itself does not have a corresponding match, producing a gap 1510.

Figure 16:
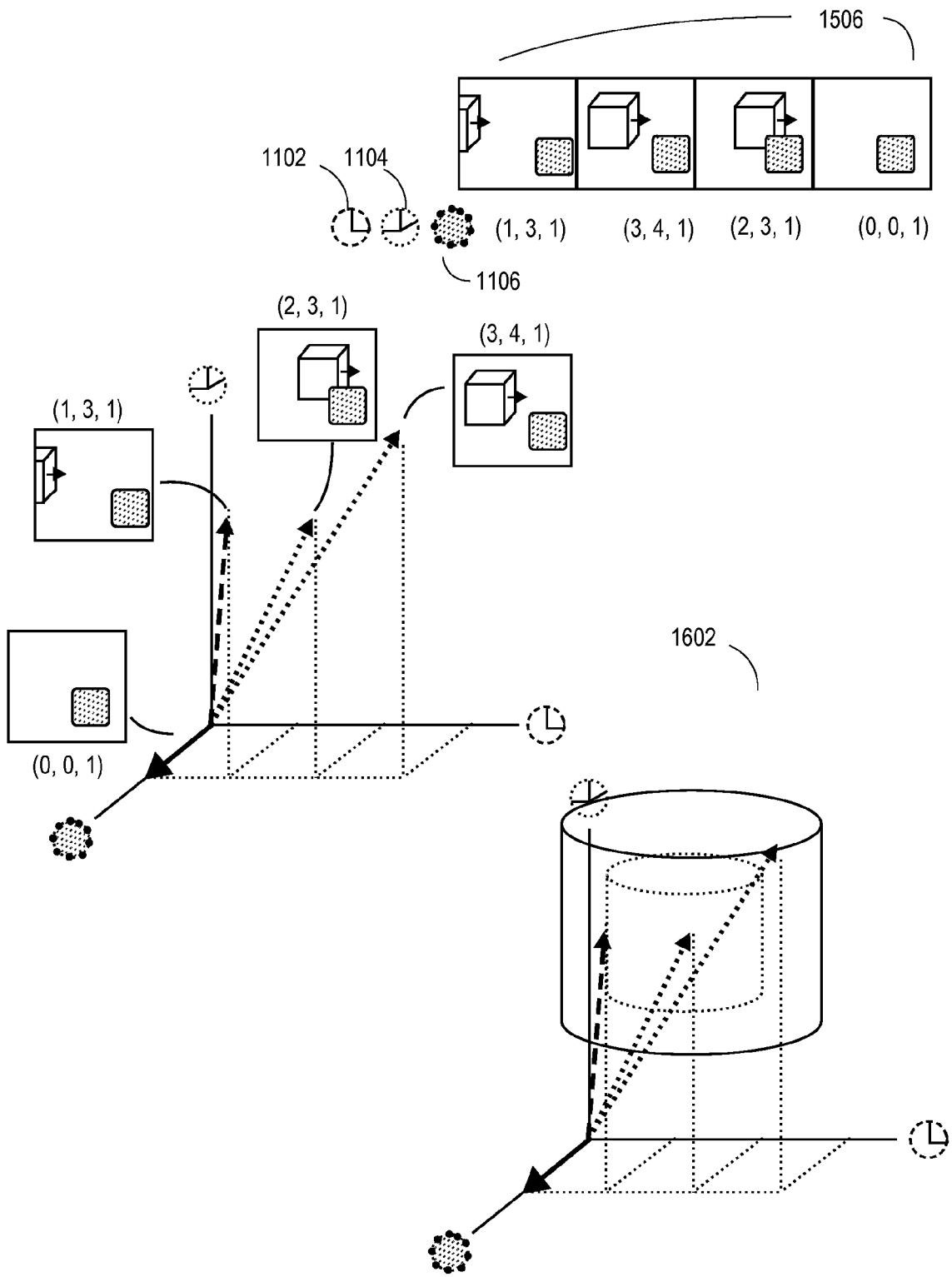
FIG. 16 shows an example of the matching process.

FIG. 16 matching process: This figure gives a detail of some of the matching steps that occur in FIG. 10. As previously discussed, matching different video nucleotides is more complex than matching biological nucleotides, because a biological nucleotide is usually a simple "A", "T", "G", or "C", whereas a video DNA nucleotide is a more complex "bag of features" (or a bag of feature descriptors). Thus it is quite often the case that a given video nucleotide will never find a perfect match. Rather, the criterion for a "match" is usually going to be a close but not quite perfect match. Often, this match will be determined by a distance function, such as a L1 distance, the Mahalanobis distance, the Kullback-Leibler divergence distance, the Earth Mover's distance, or other function.

In FIG. 16, this distance function is represented in a simplified form as a 3-dimensional Euclidean distance, "D", where:

$$D=\sqrt{((x_1-x_2)^2+(y_1-y_2)^2+(z_1-z_2)^2)}$$

here x, y, and z are the coefficients of the feature descriptors from the library or vocabulary of feature descriptors used in the simplified 3 coefficient "bag of feature descriptors" or "nucleotides", e.g. (x, y, z).

In this example, since the feature detection array only consists of the three feature detection algorithms (1102, 1104 and 1106) previously used in FIGS. 11-15, this matching process can be shown visually. Here the nucleotides (signatures) from four different video segments of the video (1506) are shown as a series of three dimensional vectors. As can be seen, the vectors from portions of the video that are more closely related end up closer to each other in three dimensional space (1602). Thus, by adjusting the similarity algorithm's allowed distance between different video signatures, the amount of video similarity needed to determine a match can be adjusted.

By varying the stringency of the similarity algorithm's match, the degree of relationship between different video segments (previously shown in FIG. 15) can be determined and adjusted to suit user needs.

Figure 17:
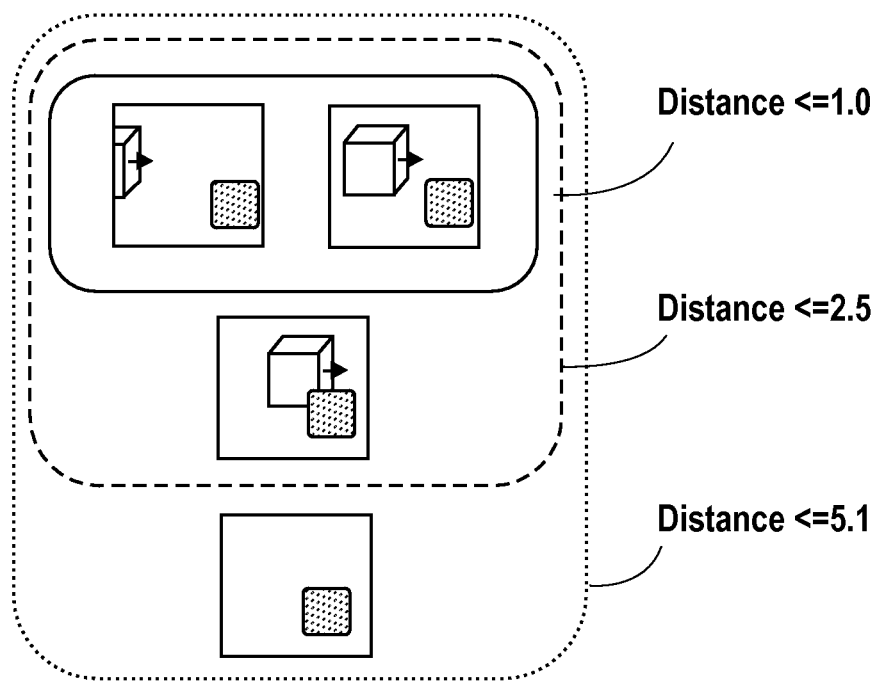
FIG. 17 shows an example of the matching results.

This is shown in FIG. 17. Here the results from the similarity comparison between the different video segments shown in FIG. 16 are shown in a Venn diagram form. The two closest video nucleotides or signatures are nucleotide (2, 3, 1) and nucleotide (1, 3, 1), which have a Euclidean distance of 1. The next closest video nucleotide or signature is nucleotide (3, 4, 1), which has a Euclidean distance of 2.23 from nucleotide (1, 3, 1), and a Euclidean distance of 1.41 from nucleotide (2, 3, 1). The video nucleotide or signature of the nucleotide that is furthest away from the others is nucleotide (0, 0, 1), which has a Euclidean distance of 5 from nucleotide (3, 4, 1), a distance of 3.16 from nucleotide (1, 3, 1), and a distance of 3.60 from nucleotide (2, 3, 1). Thus, by tuning the acceptable distance function, the criteria for a match between different nucleotides can also be varied. For example, a distance criterion of 1 or less will cause only nucleotides (2, 3, 1) and (1, 3, 1) to match. A distance criterion of 2.5 or less will cause nucleotides (2, 3, 1), (1, 3, 1), and (3, 4, 1) to match, and so on. The exact stringency of the match can be determined empirically and adjusted to optimize the detection of positive matches while minimizing the number of false matches.

Sequence matching is a key component in many video-related applications. The systems and methods discussed herein perform matching between sequences without any a priori information about these sequences. In particular, these systems and method allow accurate matching of sequences originating from the same source which have undergone modifications.

Hypervideo, or hyperlinked video, is a generic name of video content that contains embedded, user clickable anchors, allowing navigation between video and other hypermedia elements. Hypervideo is thus analogous to hypertext, a concept widely used in the World Wide Web, which allows clicking on a word in one document and retrieving information from another document. Typically, the metadata associating an action with an object is embedded into the video itself in a special format—which implies that both are distributed simultaneously by the content provider.

In the patent application "Method and apparatus for generation, distribution and display of interactive video content" U.S. application Ser. No. 11/944,290 filed Nov. 21, 2007, which application is expressly incorporated by reference herein, a client-server scheme for hypervideo is described. A feature of the scheme is that the video content and the metadata are separate. The client has the content and the server has the metadata. The link between the metadata and the video is created by computing "signatures" that uniquely describe objects in the video on the client side. The relevant metadata is retrieved by comparing these signatures to a database stored at the server.

One of the elements of the above scheme is a method for representation and comparison of video objects. The systems and methods disclosed herein discuss both aspects of video object representation and comparison.

In relation to the prior art, the video map described in the patent application "Method and apparatus for generation, distribution and display of interactive video content," can contain the video DNA described herein.

Local features, being the lowest-level constituents of the video map, correspond to visual atoms discussed herein. Shots or scenes correspond to temporal intervals in one of the embodiments discussed herein. Signatures, referred to as an aggregate of local features into a single vector in the prior art, correspond to visual nucleotides in the present invention. The two-stage temporal- and spatial-alignment scheme described herein is an algorithm for comparing two sets of signatures.

Figure 18:
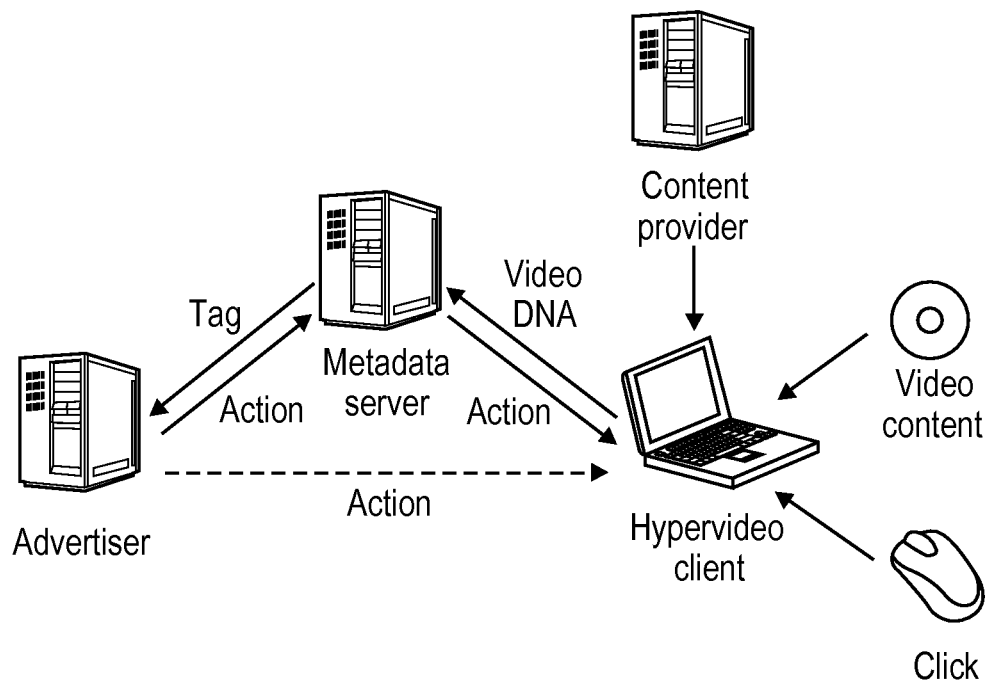
FIG. 18 shows an example hypervideo distribution system based on video genomics.

A hypervideo distribution system is shown in FIG. 18. According to this system, only the video data is streamed from a content provider to a hypervideo client. Thus, the content provider is agnostic to hypervideo and may use legacy content which contains no metadata or any additional information.

The video is uniquely identified by its video DNA, generated by the hypervideo client during the video playback. Upon the user click in a spatio-temporal location in the video, a part of this video DNA is sent to the metadata server, where it is used to identify the content, a specific temporal location in it or a specific object in a specific spatio-temporal location. The metadata server uses the same process to independently pre-compute video DNAs for the content mapped by the metadata server, which is annotated. For example, annotation may include keywords or suggested actions associated with each object in the video.

Once the video, temporal location or a specific object are identified by matching of two video DNAs, the annotation is used to generate an action which is then sent to the hypervideo client, where it is performed as a result of the click. It is possible that the action is identified by another entity (e.g. the advertiser), which associates the action with the tag provided by the metadata server.

Possible actions may include:
Navigation inside the video (e.g., jump to a similar scene).
Navigation between videos (e.g., show locations in videos similar to the currently played one).
Search (the clicked object is used as a query).
Content enrichment by retrieval of additional information about the object.
Hyperlink to media documents or Web pages, allowing performing, for example, an e-commerce transaction ("buy the clicked object").

The clicks recorded by the hypervideo client in the hypervideo applications can be indicative of the content popularity at different levels. First, the number of clicks is an evidence of the user's interest in objects appearing in the content. Second, the temporal locations of the clicks can be used to define which parts of the video were more interesting to the users. Third, the clicked objects themselves are an additional, semantic level of the user interest in the content.

A hypervideo-type interface can be used for performing video-based search. Using this approach, the clicked object is regarded as a search query.

The following possibilities of object-based search can be used:
Image query in image database: the query is an image, which is compared to a database of images and the most similar ones are retrieved. This approach is similarity-based rather than semantic.
Image query in generic database: the query is an image, which is then given a semantic label (e.g., by matching it to a database of annotated images). The label, in turn, is used to perform traditional keyword-based search in a text database.

A possible drawback of the above approaches is the lack of context. The same object may have different semantic interpretation depending on the context in which it is used. For example, clicking on an apple will generally generate search queries on fruits, while clicking on an apple in Apple computers advertisement should generate search queries on Mac computers. Video genomics can be used to match objects to the video sequences in which they are used. If the sequence is annotated, information about the context can be retrieved. For example, clicking on an apple in a Mac advertisement will match with a video sequence containing a Mac advertisement, in which the keywords will be relevant for the given context.

Figure 19:
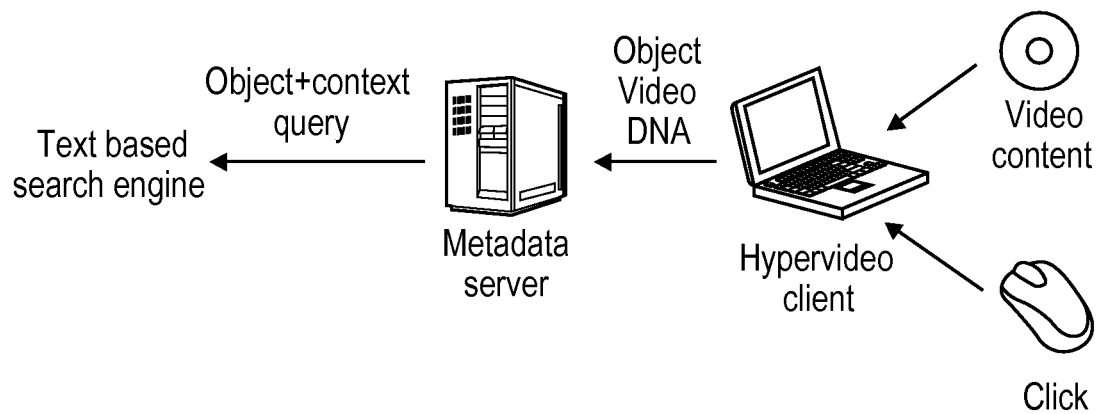
FIG. 19 shows an example object based search system.

FIG. 19 shows an example of a system to perform object-based searching based on the described approach. The hypervideo client generates video DNA upon the user clicking on an object. The video DNA is sent to the metadata server, where it is matched to annotated video sequences. Annotations from the best matching sequences are used to create a query with keywords containing the description of the object (e.g., apple) and the context in which it appears (e.g., computer).

The systems and methods described herein can be used for identification of protected and copyrighted content and prevention of its illegal distribution and viewing.

Content protection can be done in the following ways:
Content crawler: an agent accessing files shared over the network and verifying their identity.
A player that is aware of the content being played.

Figure 20:
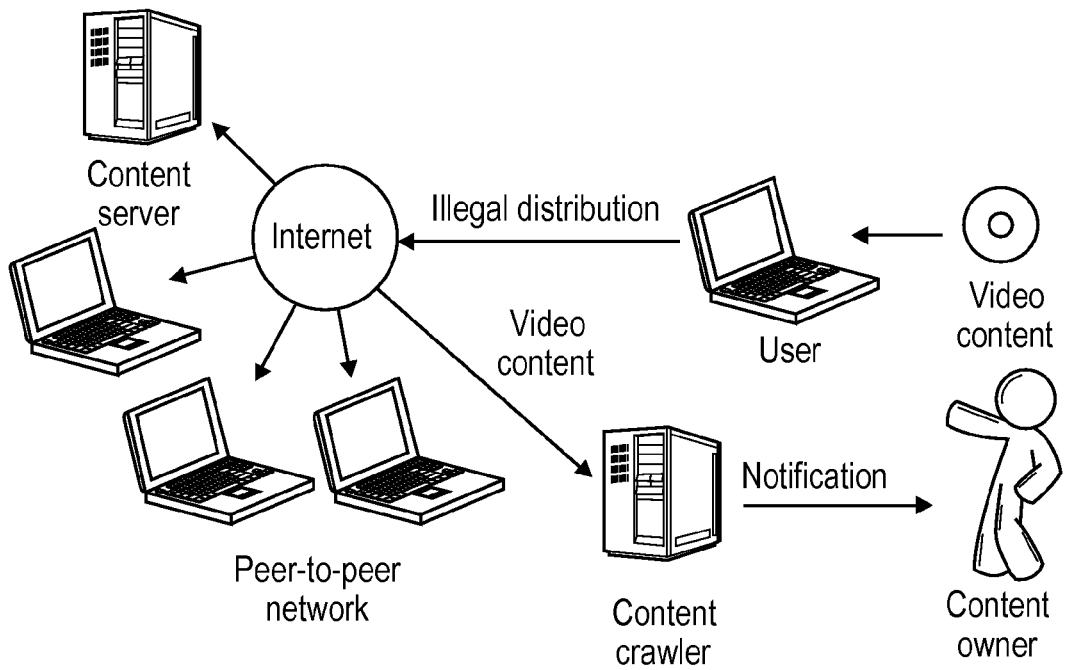
FIG. 20 shows an example of an illegal content tracking system based on video genomics.

FIG. 20 shows an example system for tracking illegal content in content servers and peer-to-peer networks. The main agent in the system is a content crawler, which has access to video content files uploaded illegally to the content server (e.g., YouTube) or illegally shared in a peer-to-peer network. The content crawler uses the video genomics approach to generate a video DNA for any piece of content that is being crawled and suspected as illegal and compares it with a database of copyrighted content. If positively identified, the crawler issues a notification to the content owner.

Figure 21:
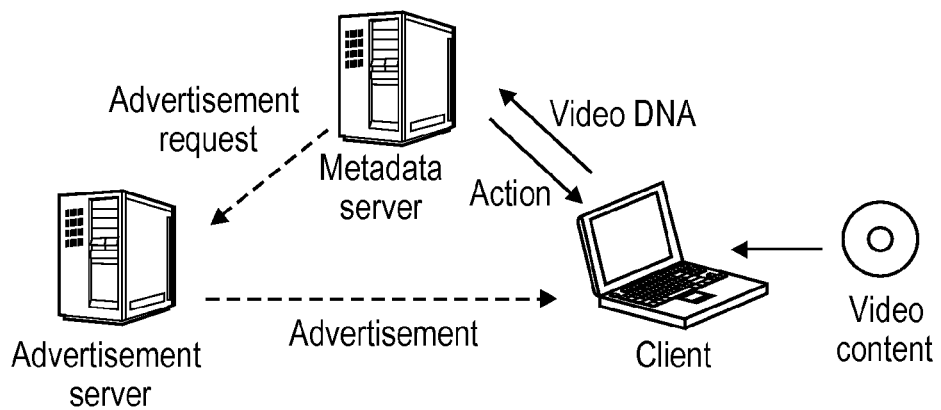
FIG. 21 shows an example system for a content-aware player based on video genomics.

FIG. 21 shows an example system for a content-aware player based on video genomics. During the content playback, the client generates the video DNA identifying the content. The video DNA is sent to the metadata server, on which a database of copyrighted content titles is stored. The metadata server verifies whether the given content is "blacklisted" and sends an action to the client, prohibiting further playback. Alternatively, the metadata server can send an action of forceful advertisement insertion, retrieved from an advertisement server. Thus, the user is able to view illegal content but forced to see advertisements.

Figure 22:
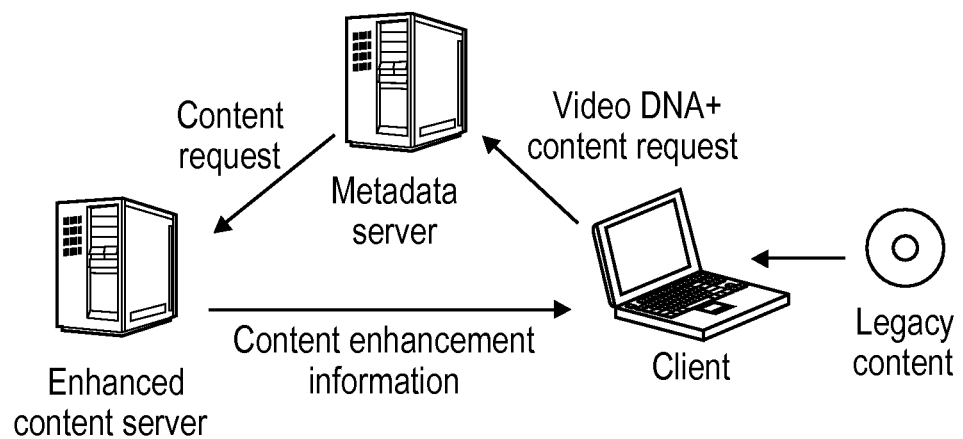
FIG. 22 shows an example of a content enhancement system based on video genomics.

Video genomics is also useful in the enhancement and enrichment of existing legacy content. Assume that a user has a collection of old DVDs and would like to view a movie with Japanese subtitles and a Polish soundtrack—features not supplied on the original DVD. FIG. 22 shows a possible architecture of a system based on video genomics allowing enhancement of legacy content. The system consists of a client, metadata server and enhanced content server. On the client, a video DNA uniquely identifying the content being played is generated (e.g., in real-time during playback or ahead of time). The video DNA is used as a unique identifier of the content, invariant to editing and distortions. Thus, different versions of the same content will have similar or identical video DNA. For example, different releases of the same movie in different resolutions, different cuts, the same movie recorded from a channel broadcast with advertisements, etc. will have similar or identical video DNA. The video DNA is sent, together with the requested content enhancement, to the metadata server, which compares the video DNA to a database of mapped content and finds the matching one. Once identified, the metadata server issues a request for content to the enhanced content server, on which the additional content is stored. The content enhancement information is then sent to the client (e.g., by streaming in real time), which displays it appropriately.

Content enhancement information can include:
Soundtracks in different audio formats and languages
Subtitles in different languages
Additional scenes not included in the original content
Hyperlinks and information about clickable objects
Video enhancement layers (e.g., HD resolution, higher frame rate, etc.), such as in the H.264 SVC (scalable video codec) format.

In content rating, like in video search, not only the semantic interpretation, but also the context in which an object appears is important. For example, a female breast appearing in the context of cancer preventive diagnostic is different from the same object appearing in the context of sexual content. Video genomics can be used for object-based content rating in the following way. First, the video DNA of the given video content is generated. Using this video DNA, matching to an annotated database is performed, recovering similar objects. This, in turn, allows retrieving the object annotations and their context. Combinations of specific objects within specific contexts as well the frequency and duration of their appearance are used to decide the rating of the content.

Another application of the systems and methods discussed herein is object-based content digesting. A video digest is created by extracting the most important or most representative parts of a video sequence. As previously discussed, an example of video digesting is described in the application entitled "METHOD AND APPARATUS FOR VIDEO DIGEST GENERATION" bearing U.S. application Ser. No. 11/778,633, filed Jul. 16, 2007, which application is expressly incorporated by reference herein.

The following criteria can be used in determining the importance of a part of a sequence:
  Self-similarity: if the part is repeating in the same sequence, it can be displayed only once and other instances removed.
  Similarity to positive examples: parts similar to content which was tagged as important (either by default settings or by analyzing the user behavior) are important.
  Dissimilarity to negative examples: parts similar to content which was tagged as unimportant are unimportant.

Video genomics can be used in establishing the above similarities, where similarity criteria can be based on the similarity of objects in the sequences, their contexts, or both.

Figure 23:
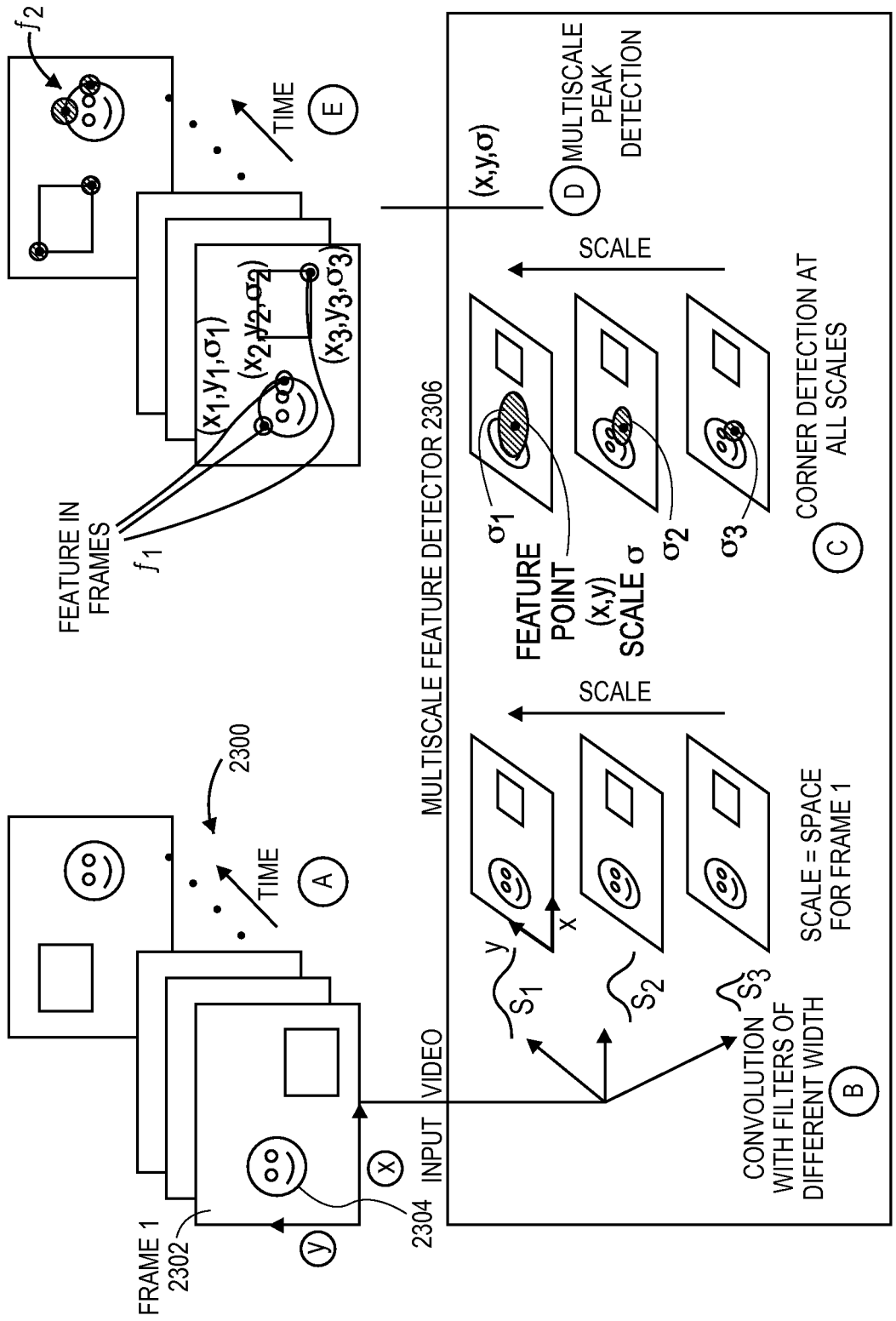
FIG. 23 shows an example of video signature feature detection.

FIGS. 23-27 illustrate example implementations of various systems, methods and configurations discussed herein. FIG. 23 shows an example of video signature feature detection. In this example, an input video (A) is composed of a series of multiple frames 2300 having a feature image 2304 and an area defined by x and y over a period of time. Input video (A) is used as input into a multi-scale feature detector 2306. The video signals s1, s2, s3 are subjected to a convolution with filters of different spatial width (B), producing a series of images with different feature scales of resolution. These different scale space images are then analyzed (for example by corner detection), at the different scales 1, 2, 3 in (C). The picture can then be described by a series of multiscale peaks (D) where certain features f1, f2, in the frames (E) are identified.

Figure 24:
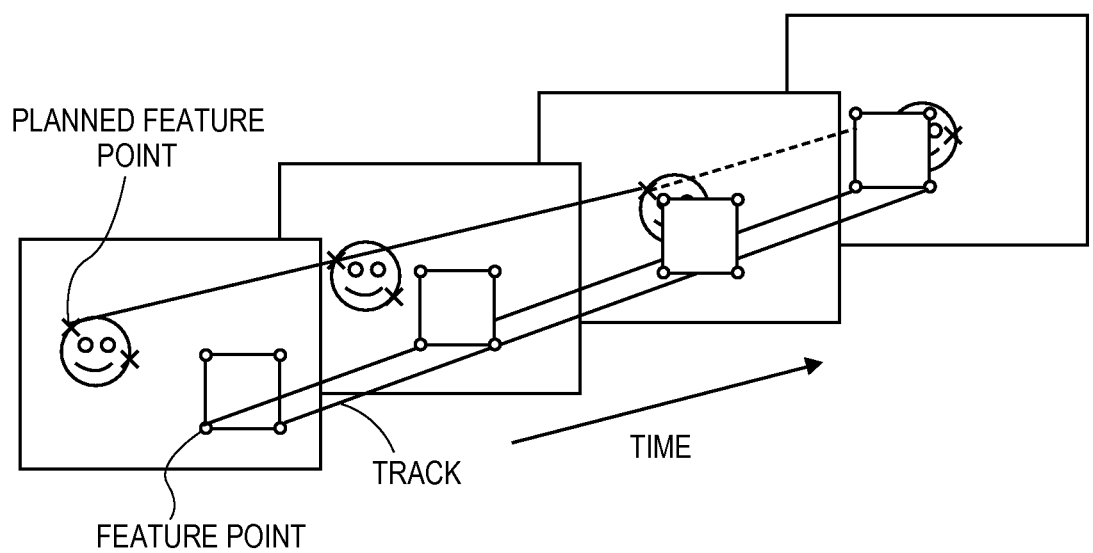
FIG. 24 shows an example of video signature feature tracking and pruning.

FIG. 24 shows an example of video signature feature tracking and pruning. This is an optional stage, but if it is used, features may be tracked over multiple frames and features that persist for enough frames (e.g., meet a preset criteria) are retained, while transient features that do not persist long enough to meet the preset criteria are rejected.

Figure 25:
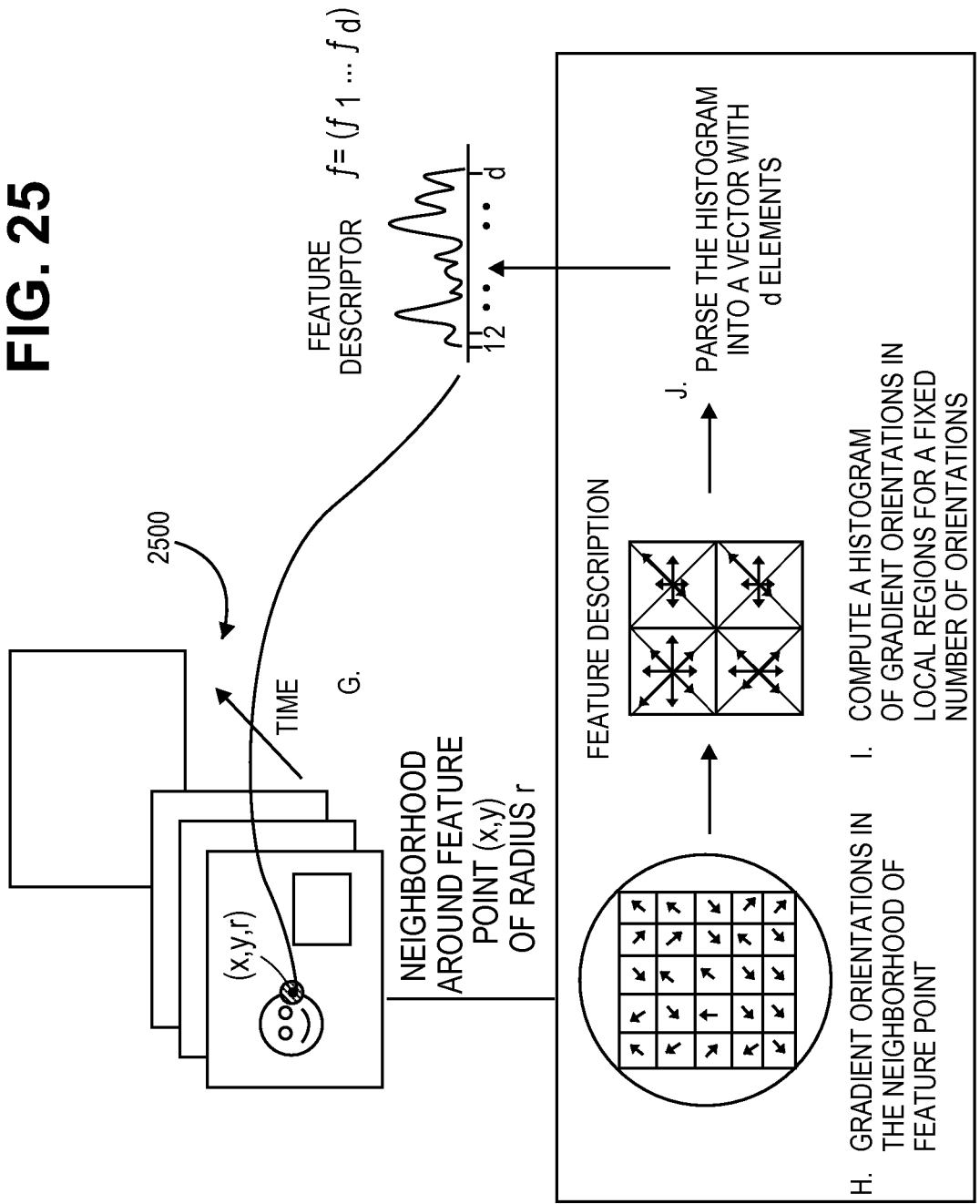
FIG. 25 shows an example of video signature feature description.

FIG. 25 shows an example of video signature feature description. The example of FIG. 25 illustrates how previously detected features can then be described. In general, the process works by again taking the input video 2500, and analyzing the video in the neighborhood (x, y, r) around each of the previously detected features (G). This feature description process can be done by a variety of different methods. In this example, a SIFT gradient of the image around the neighborhood of a feature point is computed (H), and from this gradient a histogram of gradient orientations in local regions for a fixed number of orientations is generated (I). This histogram is then parsed into a vector with elements (J), called a feature descriptor.

Figure 26:
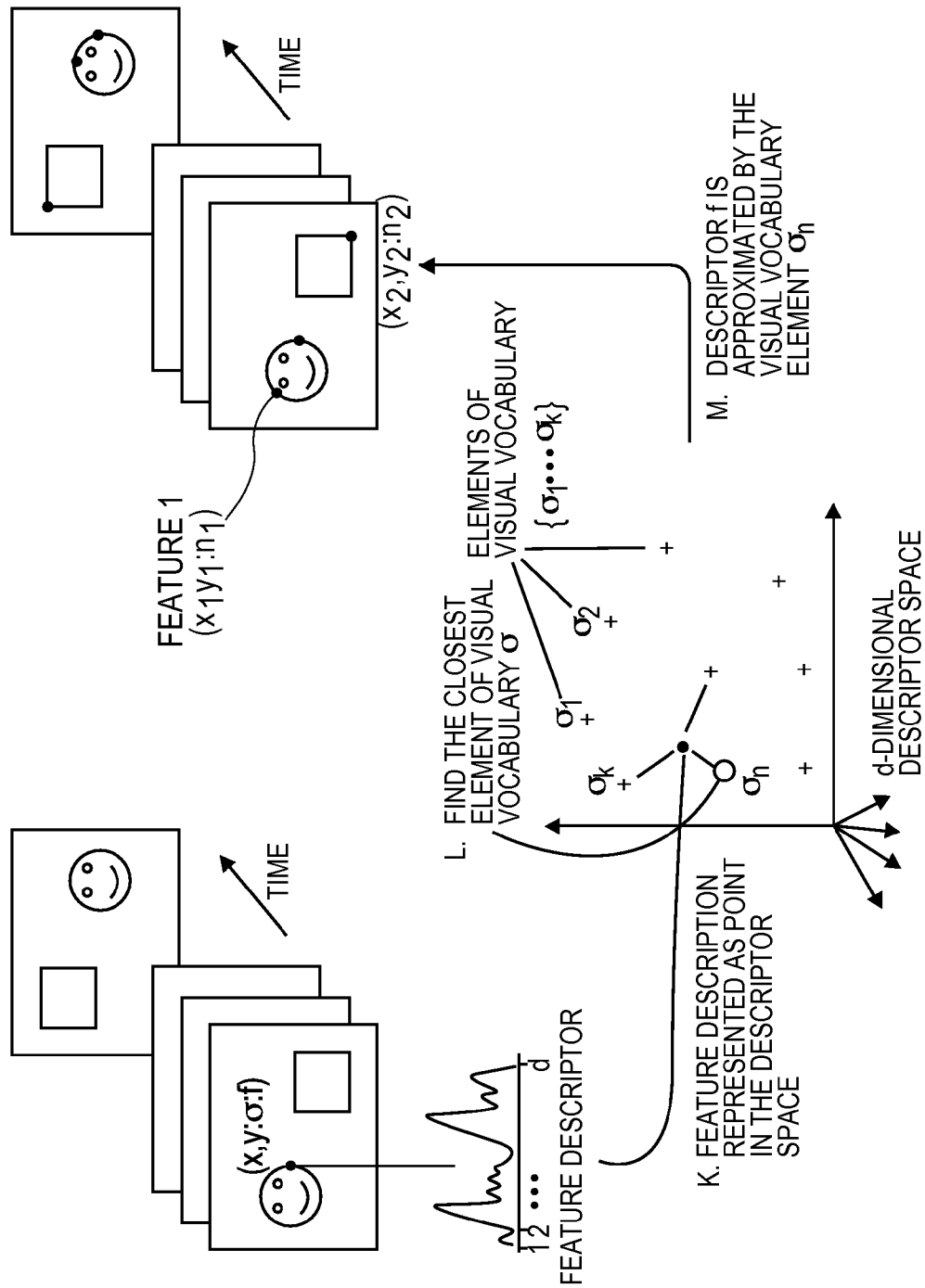
FIG. 26 shows an example of a vector quantization process.

FIG. 26 shows an example of a vector quantization process that maps an image into a series of quantized feature descriptors. In this example, the video image, previously described as a feature descriptor vector (K) with an arbitrary feature descriptor vocabulary, is mapped onto a standardized d-dimensional feature descriptor vocabulary (L). This use of a standardized descriptor vocabulary enables a standardized scheme (M) that is capable of uniquely identifying video, regardless of the video source.

Figure 27:
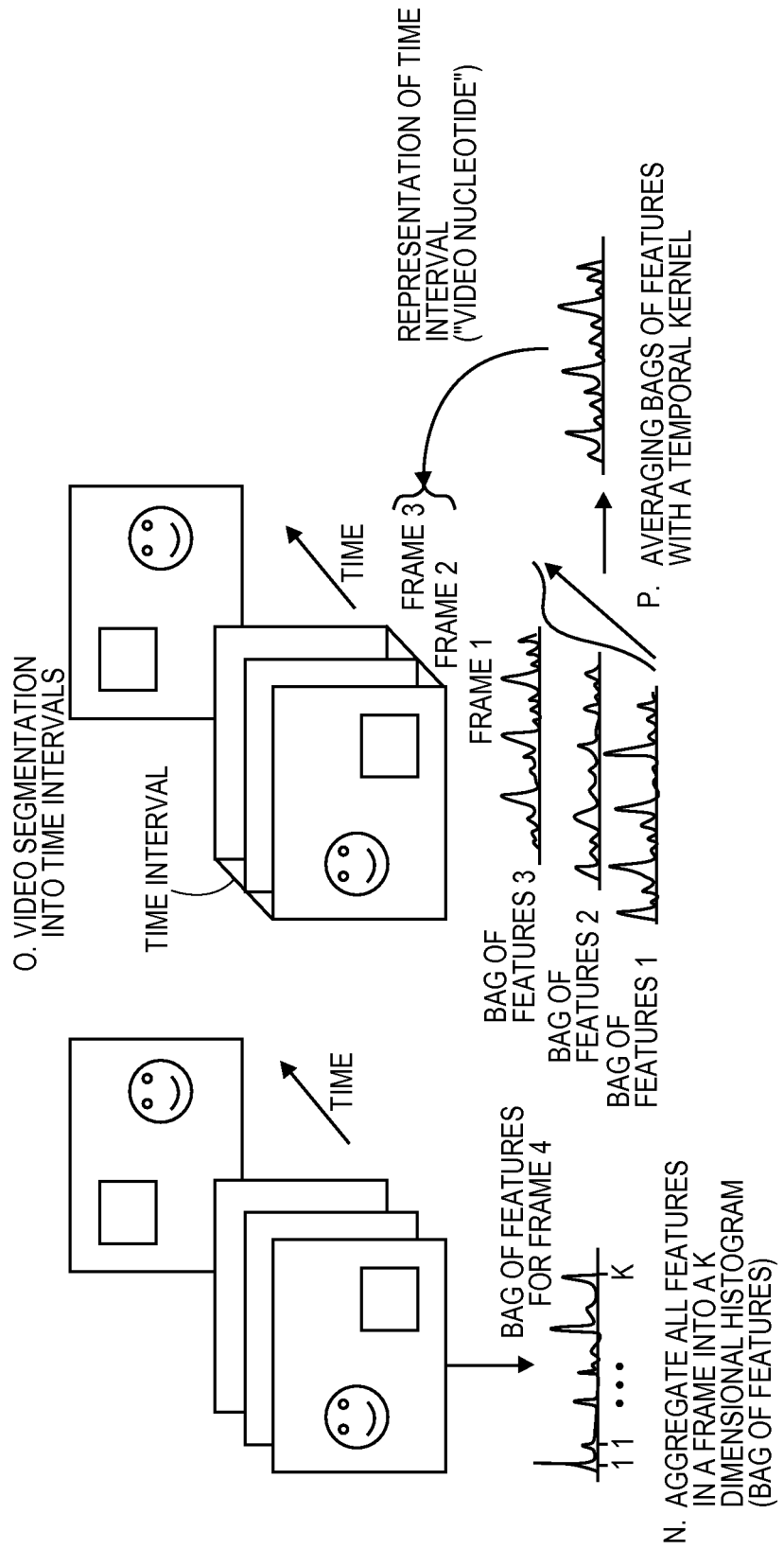
FIG. 27 shows an example of video DNA construction.

FIG. 27 shows an example of video DNA construction. In contrast to standard video analysis, which often analyzes video on a frame-by-frame basis, video DNA often combines or averages bags of features from multiple video frames to produce an overall "video nucleotide" for a time interval. An example of this is shown in FIG. 27. As previously discussed, the video data is analyzed and bags of features for particular frames are aggregated into k dimensional histograms or vectors (N). These bags of features from neighboring video frames (e.g., frame 1, frame 2, frame 3) are then averaged (P), producing a representation of a multi-frame video time interval, often referred to herein as a "video nucleotide".

Figure 28:
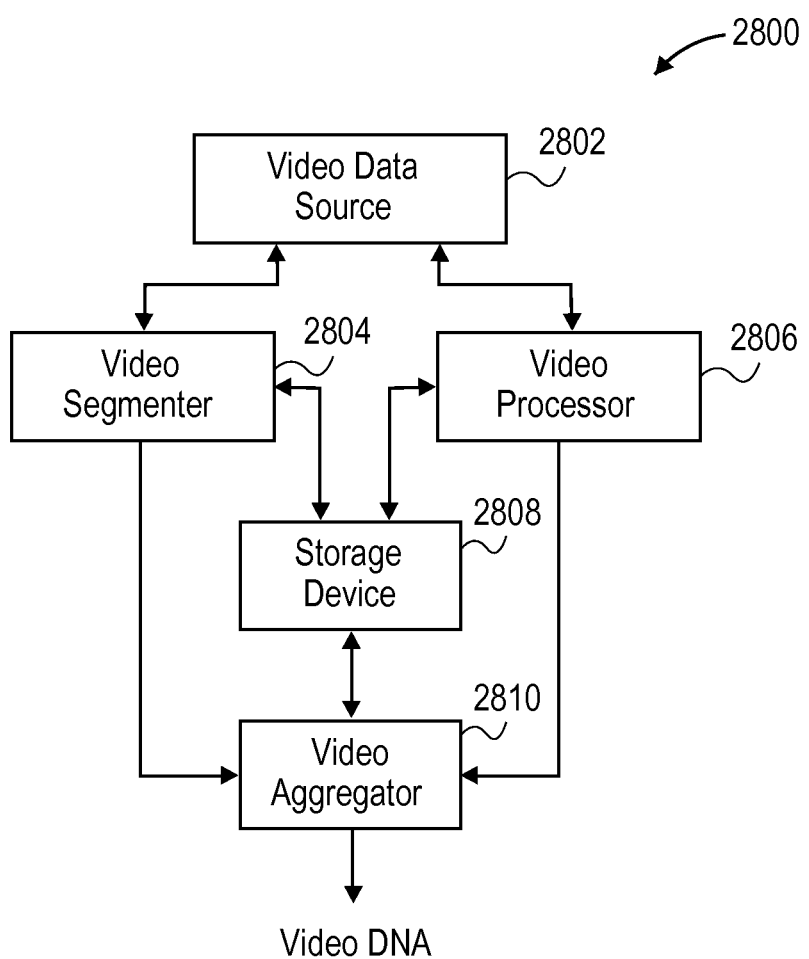
FIG. 28 shows an example system for processing video data as described herein.

FIG. 28 shows an example system 2800 for processing video data as described herein. A video data source 2802 stores and/or generates video data. A video segmenter 2804 receives video data from video data source 2802 and segments the video data into temporal intervals. A video processor 2806 receives video data from video data source 2802 and performs various operations on the received video data. In this example, video processor 2806 detects feature locations within the video data, generates feature descriptors associated with the feature locations, and prunes the detected feature locations to generate a subset of feature locations. A video aggregator 2810 is coupled to video segmenter 2804 and video processor 2806. Video aggregator 2810 generates a video DNA associated with the video data. As discussed herein, the video DNA can include video data ordered as sequences of visual nucleotides.

A storage device 2808 is coupled to video segmenter 2804, video processor 2806, and video aggregator 2810, and stores various data used by those components. The data stored includes, for example, video data, frame data, feature data, feature descriptors, visual atoms, video DNA, algorithms, settings, thresholds, and the like. The components illustrated in FIG. 28 may be directly coupled to one another and/or coupled to one another via one or more intermediate devices, systems, components, networks, communication links, and the like.

Although the components and modules illustrated herein are shown and described in a particular arrangement, the arrangement of components and modules may be altered to perform video processing in a different manner. In other embodiments, one or more additional components or modules may be added to the described systems, and one or more components or modules may be removed from the described systems. Alternate embodiments may combine two or more of the described components or modules into a single component or module. Additionally, the example procedures and methods discussed herein may be performed in any order. Certain procedures and methods (including steps within those procedures and methods) may be omitted and/or performed in a different order for specific implementations.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method of determining temporal correspondence between different sets of video data, the method comprising:
   inputting the sets of video data;
   representing the video data as ordered sequences of visual nucleotides; and
   determining temporally corresponding subsets of video data by aligning the sequences of visual nucleotides;
   wherein the visual nucleotides are computed by:
   representing a temporal interval of the video data as a collection of features and feature descriptors;
   discarding the spatial coordinates of the features, and grouping similar feature descriptors into bins according to a grouping function; and
   creating visual nucleotides that correspond to the coefficients of the various feature descriptor bins; and
   wherein the features are chosen so as to be substantially invariant with respect to video resolution, orientation, or lighting.

2. The method of claim 1, further comprising computing a spatial correspondence between the temporally corresponding subsets of video data.

3. The method of claim 2, wherein computing spatial correspondence is performed by:
   inputting temporally corresponding subsets of video data;
   providing feature points in subsets of video data;
   finding correspondence between feature points; and
   finding correspondence between spatial coordinates.

4. The method of claim 3, wherein finding correspondence between feature points is performed by finding parameters of a model describing the transformation between two sets of feature points, wherein finding parameters of a model is performed by solving the following optimization problem $$\theta^* = \arg\min_{\theta} T(\{(x_i, y_i)\}, \{(x_j, y_j)\}; \theta)$$

where $\{(x_i, y_i)\}$ and $\{(x_j, y_j)\}$ are two sets of feature points and T is a parametric transformation between sets of points depending on parameters $\theta$.

5. The method of claim 1, wherein the video data is segmented into temporal intervals including a plurality of time-consecutive video image frames, and wherein one visual nucleotide is computed for each interval.

6. The method of claim 5, wherein computing a collection of feature descriptors is performed by:
   tracking of corresponding invariant feature points in the temporal interval of the video data;
   computing a single descriptor as a function of the descriptors of the invariant feature points belonging to a track; and
   assigning the descriptor to all features belonging to the track.

7. The method of claim 6, wherein a function of the descriptors of the invariant feature points belonging to a track is the average of the invariant feature points descriptors, or the median of the invariant feature points descriptors.

8. The method of claim 1, wherein aligning sequences of visual nucleotides includes:
   receiving two sequences of visual nucleotides $s=\{s_1, \ldots, s_M\}$ and $q=\{q_1, \ldots, q_m\}$ as the input;
   receiving a score function $\sigma(s_i, q_j)$ and a gap penalty function $\gamma(i,j,n)$ as the parameters;
   finding the partial correspondence $C=\{(i_1,j_1), \ldots, (i_K, j_K)\}$ and the collection of gaps $G=\{(l_1,m_1,n_1), \ldots, (l_L,m_L,n_L)\}$ maximizing the F(C,G) function:

$$F(C, G) = \sum_{k=1}^{K} \sigma(s_{i_k}, q_{j_k}) + \sum_{k=1}^{L} \gamma(l_k, m_k, n_k)$$

and outputting the found partial correspondence C and the maximum value of the function.

9. The method of claim 8, wherein the score function is inversely proportional to a distance function $d(s_i, q_j)$, and the distance function comprises a combination of distance functions selected from the group consisting of the Euclidean distance, the L1 distance, the Mahalanobis distance, the Kullback-Leibler divergence distance, and the Earth Mover's distance.

10. The method of claim 1, wherein the feature descriptors describe the visual content of a local spatio-temporal region of the video data.

11. The method of claim 10, wherein the feature descriptors are SIFT descriptors, spatio-temporal SIFT descriptors, or SURF descriptors.

12. The method of claim 1, wherein the grouping function weighs the contribution of a particular visual feature in the nucleotide by a function that comprises the temporal location of the feature in the temporal interval, the spatial location of the feature in the temporal interval, or the significance of the feature.

13. The method of claim 1, wherein the features in the temporal interval are computed using detectors comprising detectors selected from the group consisting of Harris-Laplace corner detectors, affine-invariant Harris-Laplace corner detectors, Harris-Laplace corner detectors, spatio-temporal corner detectors or a MSER algorithm.

14. An apparatus comprising:
   a source of video data;
   a video segmenter coupled to the source of video data and configured to segment video data into temporal intervals, wherein the temporal intervals include a plurality of time-consecutive video image frames; and
   a video processor coupled to the source of video data and configured to compute a visual nucleotide for each temporal interval;
   wherein the video processor computes the visual nucleotides by:
   representing a temporal interval of the video data as a collection of features and feature descriptors;
   discarding spatial coordinates of the features and grouping similar feature descriptors into bins according to a grouping function; and
   creating visual nucleotides that correspond to the coefficients of the feature descriptor bins;
   wherein the features are chosen by the video processor to be substantially invariant with respect to video resolution, video orientation, and video lighting.

15. The apparatus of claim 14, further comprising a video aggregator coupled to the video segmenter and the video processor, the video aggregator configured to generate a video DNA associated with the video data, wherein the video DNA includes video data ordered as sequences of visual nucleotides.

16. The apparatus of claim 14, wherein the video processor computes a collection of feature descriptors by:
- tracking corresponding invariant feature points in the temporal interval of the video data;
- computing a single descriptor as a function of the descriptors of the invariant feature points belonging to a track; and
- assigning the descriptor to all features belonging to the track.

17. A method of determining temporal correspondence between different sets of video data, the method comprising:
- inputting the sets of video data;
- representing the video data as ordered sequences of visual nucleotides; and
- determining temporally corresponding subsets of video data by aligning the sequences of visual nucleotides;
- further comprising computing a spatial correspondence between the temporally corresponding subsets of video data;
- wherein computing spatial correspondence is performed by:
  - inputting temporally corresponding subsets of video data;
- providing feature points in subsets of video data;
- finding correspondence between feature points; and
- finding correspondence between spatial coordinates;
- wherein finding correspondence between feature points is performed by finding parameters of a model describing the transformation between two sets of feature points, wherein finding parameters of a model is performed by solving the following optimization problem $$\theta^* = \arg\min_{\theta} T(\{(x_i, y_i)\}, \{(x_j, y_j)\}; \theta)$$

where $\{(x_i, y_i)\}$ and $\{(x_j, y_j)\}$ are two sets of feature points and T is a parametric transformation between sets of points depending on parameters $\theta$.

18. A method of determining temporal correspondence between different sets of video data, the method comprising:
- inputting the sets of video data;
- representing the video data as ordered sequences of visual nucleotides; and
- determining temporally corresponding subsets of video data by aligning the sequences of visual nucleotides;
- wherein the video data is segmented into temporal intervals including a plurality of time-consecutive video image frames, and wherein one visual nucleotide is computed for each interval;
- wherein the visual nucleotide is computed by:
- representing a temporal interval of the video data as a collection of features and feature descriptors;
- discarding the spatial coordinates of the features, and
- grouping similar feature descriptors into bins according to a grouping function; and
- creating visual nucleotides that correspond to the coefficients of the various feature descriptor bins;
- wherein the features are chosen so as to be invariant with respect to video resolution, orientation, or lighting;
- wherein computing a collection of feature descriptors is performed by:
- tracking of corresponding invariant feature points in the temporal interval of the video data;
- computing a single descriptor as a function of the descriptors of the invariant feature points belonging to a track; and
- assigning the descriptor to all features belonging to the track; and
- wherein a function of the descriptors of the invariant feature points belonging to a track is the average of the invariant feature points descriptors, or the median of the invariant feature points descriptors.

19. A method of determining temporal correspondence between different sets of video data, the method comprising:
- inputting the sets of video data;
- representing the video data as ordered sequences of visual nucleotides; and
- determining temporally corresponding subsets of video data by aligning the sequences of visual nucleotides;
- wherein aligning sequences of visual nucleotides includes:
  - receiving two sequences of visual nucleotides $s=\{s_1,\ldots,s_M\}$ and $q=\{q_1,\ldots,q_M\}$ as the input;
  - receiving a score function $\sigma(s_i,q_j)$ and a gap penalty function $\gamma(i,j,n)$ as the parameters;
  - finding the partial correspondence $C=\{(i_1,j_1),\ldots,(i_K,j_K)\}$ and the collection of gaps $G=\{(l_1,m_1,n_1),\ldots,(l_L,m_L,n_L)\}$ maximizing the $F(C,G)$ function:

$$F(C, G) = \sum_{k=1}^{K} \sigma(s_{i_k}, q_{j_k}) + \sum_{k=1}^{L} \gamma(l_k, m_k, n_k)$$

and outputting the found partial correspondence C and the maximum value of the function.

20. The method of claim 19, wherein the score function is inversely proportional to a distance function $d(s_i, q_j)$, and the distance function comprises a combination of distance functions selected from the group consisting of the Euclidean distance, the L1 distance, the Mahalanobis distance, the Kullback-Leibler divergence distance, and the Earth Mover's distance.

* * * * *